(12) United States Patent
Teddy et al.

(10) Patent No.: US 9,614,865 B2
(45) Date of Patent: Apr. 4, 2017

(54) SERVER-ASSISTED ANTI-MALWARE CLIENT

(71) Applicant: McAfee, Inc., Santa Clara, CA (US)

(72) Inventors: John Teddy, Portland, OR (US); James Douglas Bean, Tigard, OR (US); Gregory William Dalcher, Tigard, OR (US); Jeff Hetzler, Manning, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/976,988

(22) PCT Filed: Mar. 15, 2013

(86) PCT No.: PCT/US2013/032186
§ 371 (c)(1),
(2) Date: Jun. 27, 2013

(87) PCT Pub. No.: WO2014/142986
PCT Pub. Date: Sep. 18, 2014

(65) Prior Publication Data
US 2014/0283065 A1 Sep. 18, 2014

(51) Int. Cl.
G06F 11/00 (2006.01)
G06F 12/14 (2006.01)
G06F 12/16 (2006.01)
G08B 23/00 (2006.01)
(Continued)

(52) U.S. Cl.
CPC .......... *H04L 63/145* (2013.01); *H04L 67/06* (2013.01); *H04L 67/34* (2013.01)

(58) Field of Classification Search
CPC ........ G06F 21/51; G06F 21/56–21/568; H04L 63/14; H04L 63/145; H04L 67/06; H04L 67/34; H04L 29/06918; H04L 9/002
See application file for complete search history.

(56) References Cited

U.S. PATENT DOCUMENTS

| 5,960,170 A | 9/1999 | Chen et al. |
| 5,987,610 A | 11/1999 | Franczek et al. |
| 6,073,142 A | 6/2000 | Geiger et al. |

(Continued)

FOREIGN PATENT DOCUMENTS

| WO | WO 2014/143000 | 9/2014 |
| WO | WO 2014/143012 | 9/2014 |

OTHER PUBLICATIONS

PCT International Search Report and Written Opinion received for Patent Application No. PCT/US2013/032186, mailed on Dec. 19, 2013.

(Continued)

*Primary Examiner* — Michael S McNally
*Assistant Examiner* — Trong Nguyen
(74) *Attorney, Agent, or Firm* — Patent Capital Group

(57) ABSTRACT

A host-based antimalware client can interface with a server-based antimalware support server. A file is identified at a host device. It is determined whether local reputation data for the file is available at the host device for the file. A query is sent to an antimalware support system relating to the file. Particular reputation data is received from the antimalware support system corresponding to the query. It is determined whether to allow the file to be loaded on the host device based at least in part on the particular reputation data.

17 Claims, 21 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 6,092,194 A * | 7/2000 | Touboul | 726/24 |
| 6,460,050 B1 | 10/2002 | Pace et al. | |
| 7,506,155 B1 | 3/2009 | Stewart et al. | |
| 8,078,707 B1 | 12/2011 | Watsen et al. | |
| 8,402,543 B1 | 3/2013 | Ranjan et al. | |
| 8,443,449 B1 * | 5/2013 | Fan | G06F 21/564 713/188 |
| 9,053,146 B1 | 6/2015 | Kapoor et al. | |
| 9,143,519 B2 | 9/2015 | Teddy et al. | |
| 2002/0154268 A1 | 10/2002 | Noto et al. | |
| 2004/0117640 A1 | 6/2004 | Chu et al. | |
| 2004/0128355 A1 | 7/2004 | Chao et al. | |
| 2005/0182958 A1 * | 8/2005 | Pham et al. | 713/200 |
| 2006/0179484 A1 | 8/2006 | Scrimsher et al. | |
| 2006/0272014 A1 | 11/2006 | McRae et al. | |
| 2007/0143827 A1 | 6/2007 | Nicodemus et al. | |
| 2007/0143851 A1 | 6/2007 | Nicodemus et al. | |
| 2008/0022384 A1 * | 1/2008 | Yee et al. | 726/11 |
| 2008/0028010 A1 | 1/2008 | Ramsey | |
| 2008/0040510 A1 | 2/2008 | Warner et al. | |
| 2008/0282347 A1 | 11/2008 | Dadhia et al. | |
| 2008/0289021 A1 | 11/2008 | Chandrasekhar et al. | |
| 2009/0007102 A1 * | 1/2009 | Dadhia et al. | 718/1 |
| 2009/0063371 A1 | 3/2009 | Lin | |
| 2009/0177514 A1 | 7/2009 | Hudis et al. | |
| 2009/0281981 A1 | 11/2009 | Chen et al. | |
| 2009/0328209 A1 * | 12/2009 | Nachenberg | 726/22 |
| 2010/0037314 A1 | 2/2010 | Perdisci et al. | |
| 2011/0038259 A1 | 2/2011 | Bharrat et al. | |
| 2011/0067101 A1 * | 3/2011 | Seshadri et al. | 726/22 |
| 2011/0162070 A1 | 6/2011 | Krasser et al. | |
| 2012/0023583 A1 | 1/2012 | Sallam | |
| 2012/0066759 A1 | 3/2012 | Chen et al. | |
| 2012/0084859 A1 | 4/2012 | Radinsky et al. | |
| 2012/0102569 A1 | 4/2012 | Turbin | |
| 2012/0240229 A1 | 9/2012 | Sobel et al. | |
| 2012/0317644 A1 * | 12/2012 | Kumar et al. | 726/24 |
| 2013/0061325 A1 | 3/2013 | Singh et al. | |
| 2013/0142427 A1 | 6/2013 | Fagg et al. | |
| 2013/0152201 A1 | 6/2013 | Gullotto et al. | |
| 2013/0198800 A1 | 8/2013 | Bezilla et al. | |
| 2014/0109170 A1 | 4/2014 | Nemiroff et al. | |
| 2014/0283066 A1 | 9/2014 | Teddy et al. | |
| 2014/0289853 A1 | 9/2014 | Teddy et al. | |
| 2015/0193695 A1 | 7/2015 | Mota et al. | |

OTHER PUBLICATIONS

PCT International Search Report and Written Opinion received for Patent Application No. PCT/US2013/032275, mailed on Dec. 26, 2013.

PCT International Search Report and Written Opinion received for PCT Patent Application No. PCT/US2013/032322 , mailed on Dec. 18, 2013.

U.S. Appl. No. 13/976,994 entitled Server-Assisted Anti-Malware Client, US 371 filing date of Aug. 28, 2013, naming inventors John D. Teddy et al.

U.S. Appl. No. 13/977,003, entitled Remote Malware Remediation, US 371 filing date of Jun. 27, 2013, naming inventors John Teddy et al.

PCT International Application Serial No. PCT/US2013/032275 entitled Server-Assisted Anti-Malware Client, filed on Mar. 15, 2013.

PCT International Application Serial No. PCT/US2013/032322 entitled Remote Malware Remediation, filed on Mar. 15, 2013.

Non-Final Office Action in U.S. Appl. No. 13/976,994 mailed on Mar. 13, 2015.

Non-Final Office Action in U.S. Appl. No. 13/977,003 mailed on Jan. 22, 2015.

Final Office Action in U.S. Appl. No. 13/976,994 mailed on Jul. 28, 2015.

Notice of Allowance in U.S. Appl. No. 13/977,003 mailed on May 11, 2015.

PCT International Preliminary Report in Patentability in PCT International Application Serial No. PCT/US2013/032186 mailed on Sep. 15, 2015.

PCT International Preliminary Report on Patentability in PCT International Application Serial No. PCT/US2013/032275 mailed on Sep. 15, 2015.

PCT International Preliminary Report on Patentability in PCT International Application Serial No. PCT/US2013/032322 mailed on Sep. 15, 2015.

* cited by examiner

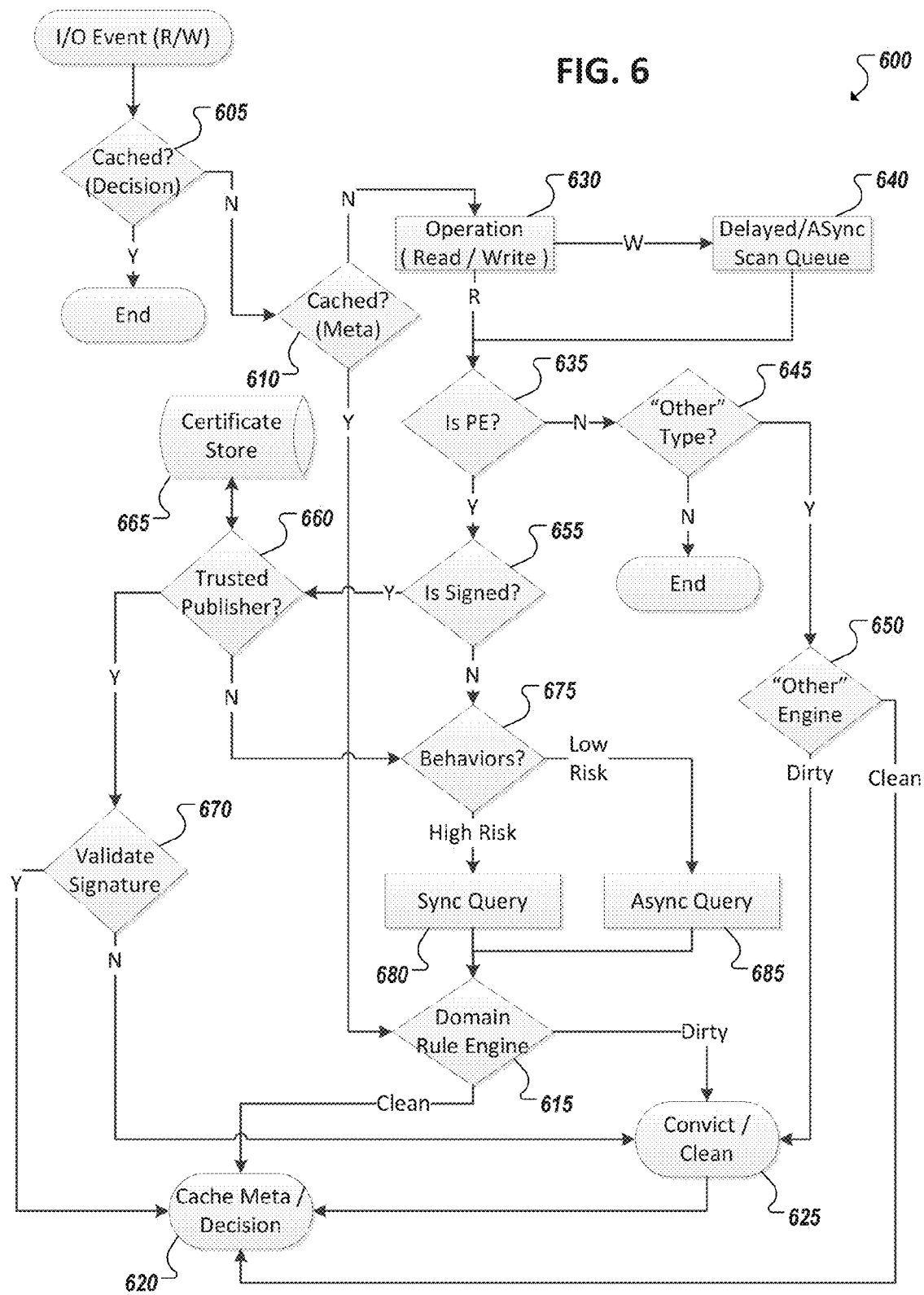

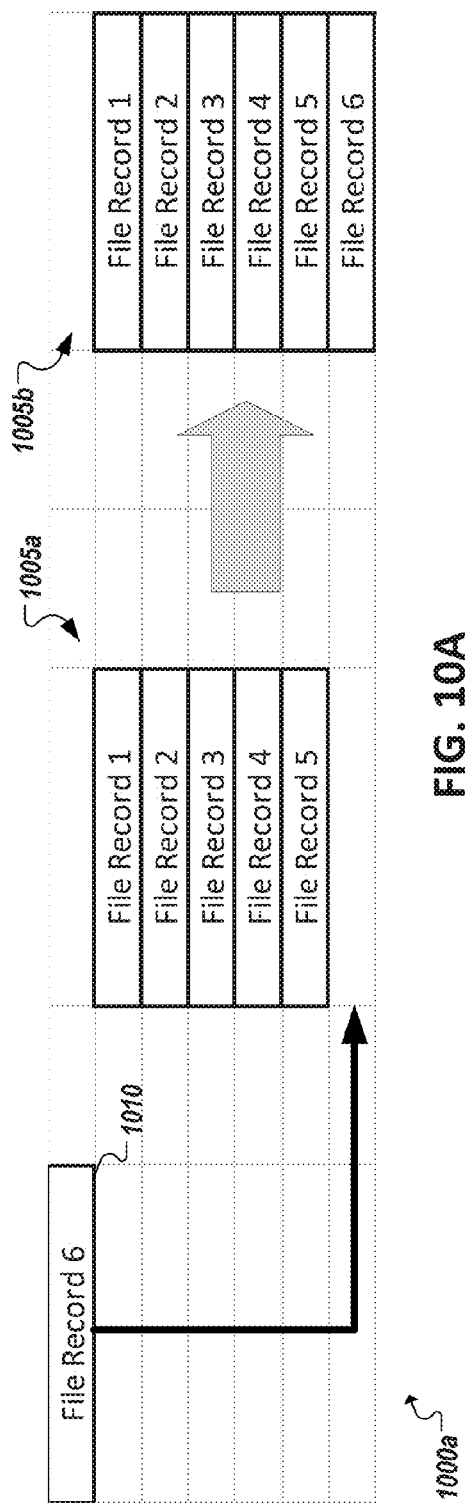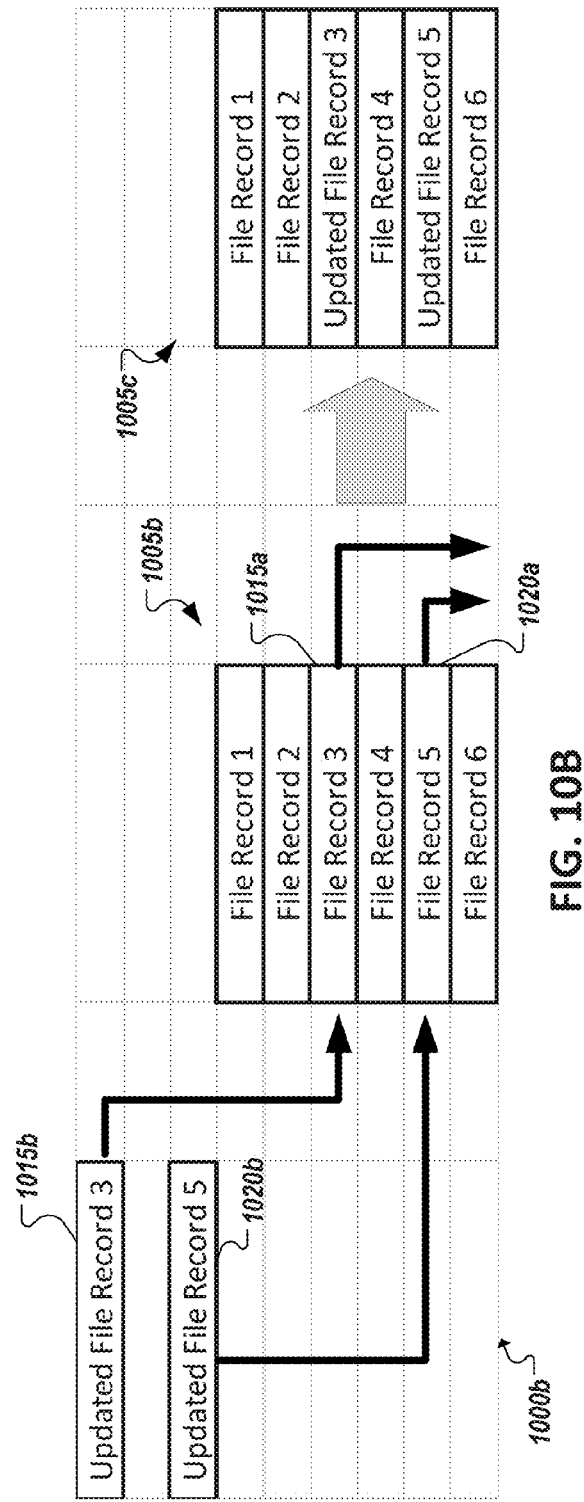

|  | CERT | HASH | SOURCE | BEHAVIORS | Prev | GLOBAL REP | GLOBAL DOMAIN REP | RESULT |
|---|---|---|---|---|---|---|---|---|
| FILE A | <cert a> | <hash a> | <IP add> | <...> | <val> | <score> | <score> | <result> |
| FILE B | <cert b> | <hash b> | <URL> | <...> | <val> | <score> | <score> | <result> |
| FILE C | <cert c> | <hash c> | <URL> | <...> | <val> | <score> | <score> | <result> |
| FILE D | <cert d> | <hash d> | <IP add> | <...> | <val> | <score> | <score> | <result> |

1100

1105 <new val>

1110 <new score>

FIG. 11

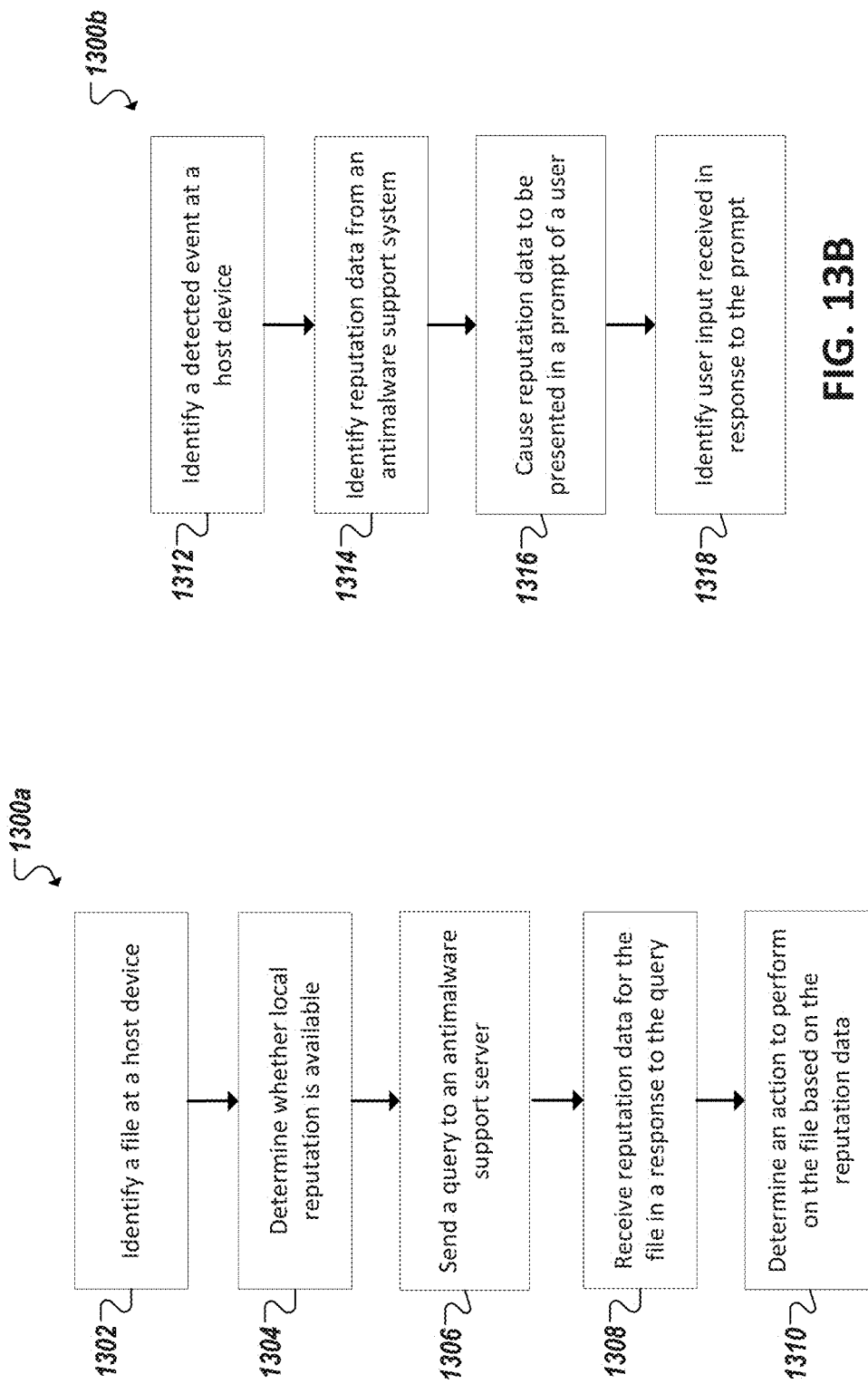

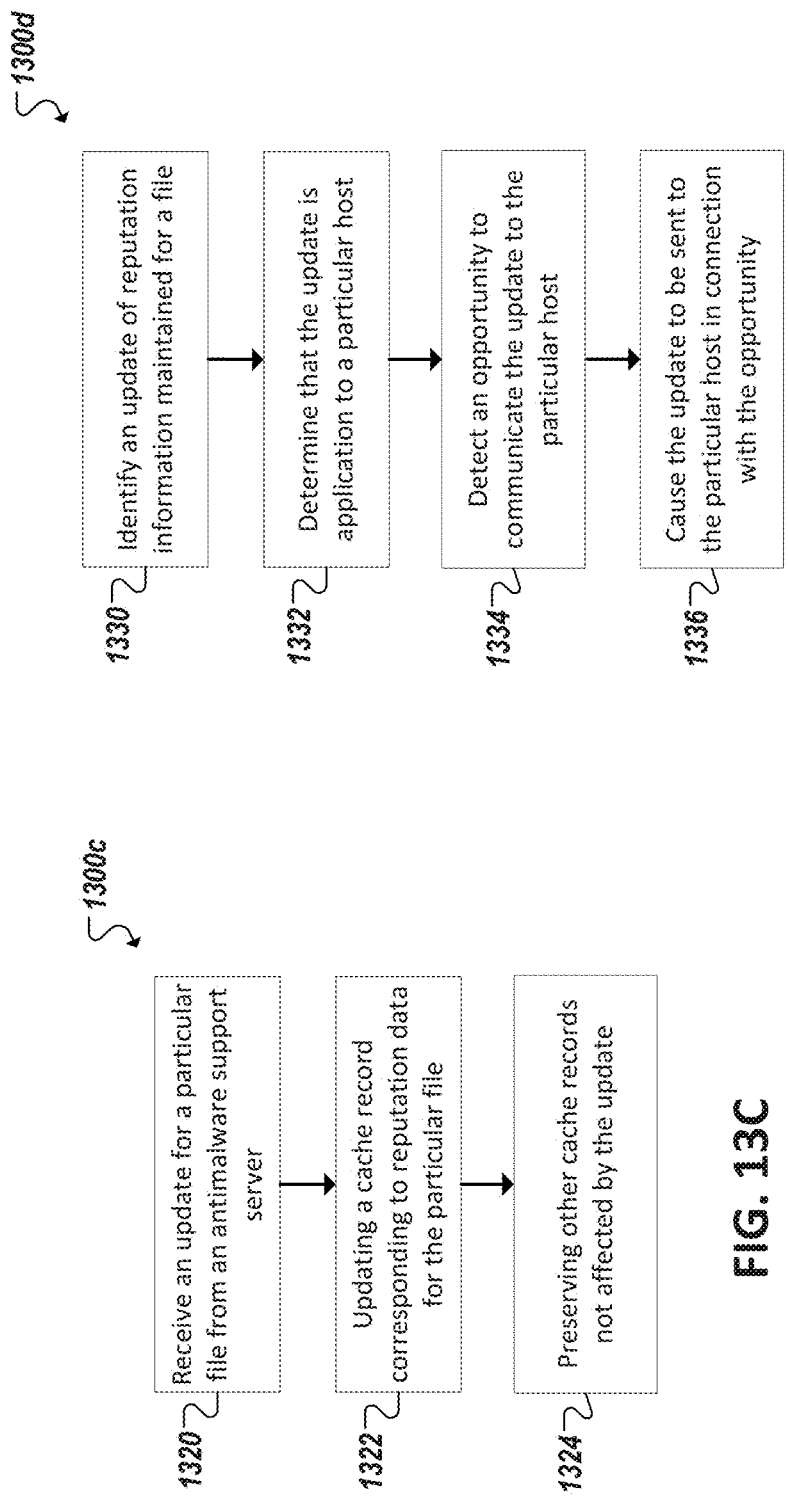

SERVER-ASSISTED ANTI-MALWARE CLIENT

CROSS-REFERENCE TO RELATED APPLICATIONS

This application is a national stage application under 35 U.S.C. §371 of PCT International Application Serial No. PCT/US2013/032186, filed on Mar. 15, 2013 and entitled SERVER-ASSISTED ANTI-MALWARE CLIENT, which is hereby incorporated by reference in its entirety. The present Application is also related to PCT International Application Serial No. PCT/US2013/032275 entitled "SERVER-ASSISTED ANTI-MALWARE", filed on Mar. 15, 2013 naming inventors John D. Teddy, James Douglas Bean, Gregory William Dalcher, Jeff Hetzler, and Andrew Arlin Woodruff, and is also related to PCT International Application Serial No. PCT/US2013/032322, entitled "REMOTE MALWARE REMEDIATION" filed on Mar. 15, 2013, naming inventors John Teddy, James Douglas Bean, Gregory William Dalcher, and Jeff Hetzler, both of which are hereby incorporated by reference in their entirety as if originally and explicitly set forth herein.

TECHNICAL FIELD

This disclosure relates in general to the field of computer security and, more particularly, to malware detection and remediation.

BACKGROUND

The Internet has enabled interconnection of different computer networks all over the world. The ability to effectively protect and maintain stable computers and systems, however, presents a significant obstacle for component manufacturers, system designers, and network operators. Indeed, each day thousands of new threats, vulnerabilities, and malware are identified that have the potential of damaging and compromising the security of computer systems throughout the world. Antivirus, antispyware, and other antimalware products and solutions have been developed. Some traditional antimalware products employ a host-centric approach in which the bulk of the functionality of the antimalware tool is installed onto the host, with the antimalware tool occasionally downloading an update of remediation tools, virus definition files, and other content to keep the antimalware tool abreast of newly discovered malware and other developments. The antimalware tool can then screen objects, processes, downloads, and other events on the host machine to determine whether malware exists on the host, per the content received from the updater, as well as attempt to remediate the malware using functionality available at the host-based antimalware tool. In some cases, the host-based antimalware tool can further attempt to remediate any malware discovered on the host by attempting, for instance, to quarantine or remove the file from the host.

BRIEF DESCRIPTION OF THE DRAWINGS

FIG. 6 is a flowchart representing example operations of an example antimalware client in accordance with one embodiment;

FIGS. 10A-10B are simplified block diagram representing an example update of cache records in accordance with at least some embodiments;

FIG. 11 is a simplified block diagram representing an example an example cache of file reputation data in accordance with one embodiment;

FIGS. 13A-13D are flowcharts representing example techniques involving a host-based antimalware client in accordance with at least some embodiments;

DETAILED DESCRIPTION OF EXAMPLE EMBODIMENTS

Figure 1:
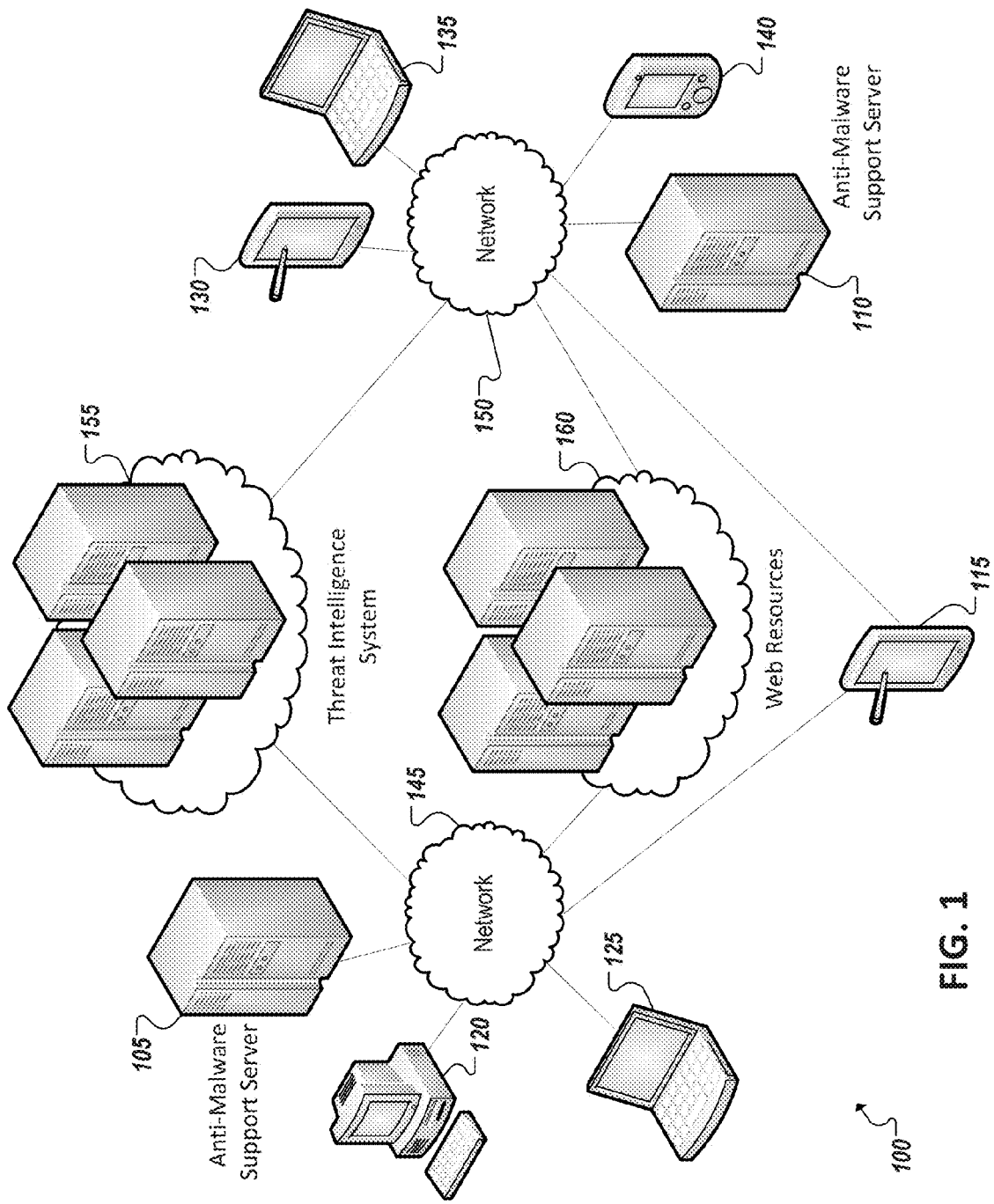
FIG. 1 is a simplified schematic diagram of an example system including an antimalware support system in accordance with one embodiment.

FIG. 1 is a simplified block diagram illustrating an example embodiment of a computing environment 100 including one or more anti-malware support system servers 105, 110 assisting antimalware clients installed on host computing devices (or "hosts") (e.g., 115, 120, 125, 130, 135, 140, etc.). An antimalware support system (e.g., 105, 110) can be associated with a particular computing domain or network (e.g., 145, 150), such as an enterprise network, university network, cellular data network, private local area network, and so on. Hosts can communicate using a particular domain's network (e.g., 145, 150) and can be associated with one or more distinct environments. Indeed, in some examples, a single host device (e.g., 115) can alternatively (or even, in some cases concurrently) access, communicate over, be resident in, or otherwise utilize multiple networks (e.g., 145, 150) of multiple environments.

In some implementations, a particular domain may have one or more dedicated antimalware support servers (e.g., 105, 110) hosting an antimalware support system configured to provide support to and operate cooperatively with antimalware clients installed on the hosts of the respective domain. In some implementations, an antimalware support system can be configured to interoperate with multiple different versions or types of antimalware clients hosted by a variety of different host devices (e.g., 115, 120, 125, 130, 135, 140). An antimalware support system (e.g., 105, 110) can be dedicated to its particular domain and can be configurable, for instance, by an administrator of the domain, to provide customized anti-malware support consistent with one or more domain-specific rules, policies, characteristics, or definitions.

In some implementations, each instance of a domain-specific antimalware support system (e.g., 105, 110) can further interface with a threat intelligence system 155 maintaining records for and detecting system threats across multiple domains. In one example, a threat intelligence system 155 can utilize data from a variety of different sensors and security tools deployed across multiple different domains, networks, and computing devices, including various types of networks and computing device to develop reputation and threat data that can be provided to other systems. A threat intelligence system 155 can, for example, correlate threat intelligence from files, web-based resources, messaging, email, networks, etc., to generate alerts and reputation updates for various threats and malware as they are detected. For instance, a threat intelligence system 155 can be utilized to collect intelligence regarding the billions of files and objects made available over the Internet by web-based sources (e.g., 160) and other actors, intelligence that could otherwise be prohibitively difficult for a single entity to collect in light of the other business and non-profit objectives, etc. of the entity, among other examples.

In some examples, a threat intelligence system 155 can gather and correlate data from, in some cases, millions of sensors gathering real-world threat information, correlate the collected data, and deliver reputation-based threat intelligence that can be consumed by sensors and security tools potentially throughout the world, including by antimalware support systems 105, 110. In some instances, various security vendors and other entities can provide separate threat intelligence feeds as services implemented using a respective threat intelligence system (e.g., 155). In some examples, an antimalware support system (e.g., 105, 110) can consume threat intelligence and reputation information developed and served by multiple different threat intelligence systems 155 and further correlate, supplement, and process the various threat intelligence data for an even more comprehensive look at the malware, malicious websites, malicious events and entities discovered by other systems potentially throughout the world (e.g., as provided to threat intelligence systems (e.g., 155) by deployed sensors and security tools, etc.).

An antimalware support system 105, 110 can include substantially comprehensive functionality for assessing, scanning, identifying, and remediating known malware. At least some of the functionality and/or content used by antimalware support systems 105, 110 to deliver this functionality, can be provided through one or more threat intelligence systems (e.g., 155) in communication with the antimalware support systems 105, 110. Threat intelligence received through threat intelligence systems (e.g., 155) can be further supplemented, modified, or filtered according to domain-specific definitions, policies, and rules defined at a respective antimalware support system (e.g., 105, 110). Further, given the robust (and in some cases, domain-specific) antimalware functionality available at an antimalware support system (e.g., 105, 110), robust antimalware tools and content supporting the functionality of such tools can be paired down substantially at the host device level. Indeed, in some examples, an antimalware client installed on the host device (e.g., 115, 120, 125, 130, 135, 140) can be "thin" in that it provides minimal functionality at the antimalware client independent of the antimalware support system (e.g., 105, 110) with which it operates. In some instances, an antimalware support system (e.g., 105, 110) can handle antimalware scans, assessments, and remediation that are beyond the capabilities of the host-based, thin antimalware clients on host devices supported by the antimalware support system (e.g., 105, 110). Further, requests, queries, and other data communicated by distributed antimalware clients can be used by antimalware support systems 105, 110 to develop cumulative and crowd-sourced intelligence concerning the particular domain served by the antimalware support system 105, 110. The antimalware support system 105, 110 can utilize such intelligence to further customize its responses within the domain, tailor how it utilized threat intelligence from other sources (e.g., threat intelligence system 155) outside of its domain, and offer administrators within the domain valuable information that can be utilized to further fine-tune and define domain-specific rules, policies, and reputation algorithms, among other examples.

In general, "servers," "devices," "computing devices," "host devices," "end user devices," "clients," "endpoints," "computers," "systems," etc. (e.g., 105, 110, 115, 120, 125, 130, 135, 140, 155, etc.) can include electronic computing devices operable to receive, transmit, process, store, or manage data and information associated with the software system 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems.

Host devices (e.g., 115, 120, 125, 130, 135, 140) can further computing devices implemented as one or more local and/or remote client or end user devices, such as personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device (or environment 100). A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software of provided in environment 100. It will be understood that there may be any number of host devices associated with environment 100, as well as any number of host devices external to environment 100. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Malware is in a constant state of development and evolution. One of the greatest challenges facing antimalware vendors and their systems is the corresponding struggle of identifying new malware as early as possible and developing mechanisms for remediating the malware before its damage is widespread. This is particularly difficult given the awesome (and ever-expanding) volume and variety of malware variations. Traditional antimalware and other security solutions have relied upon databases of malware definitions that can be used to store and organize the content utilized by traditional antimalware solutions to attempt to keep pace with new developments and identify and remediate malware on a host device. Traditionally, databases have been used to store malware definitions and other content depended on by antimalware tools, with such databases and antimalware tools hosted locally on the host device protected by the antimalware tools. As new malware is discovered, the database is to be updated so that the host-based-antimalware tool is not using stale malware definitions and potentially missing new and active malware potentially threatening the host device (and with it, potentially other host devices and domains in communication with the infected host device).

In some cases, traditional systems update their definitions daily with additional content uploaded by a server. In some environments, each time a host device is started or restarted, new definitions are uploaded to update the host device's antimalware tools. In some cases, these new definitions can include large amounts of data taking potentially several minutes to upload, depending, for instance, on the processing power of the host device, the bandwidth of the network used, among other factors. Additionally, a common complaint of traditional antimalware systems is that their presence degrades the overall performance of the host device, given the large amount of processing and data overhead utilized by antimalware tools. This can be an unfortunate and ironic result for users employing antimalware solutions with the hope that such tools will protect their machines from malware that threatens to impede or damage the performance of their machine.

Additionally, as the paradigm within computing continues to shift from desktop computers to mobile computing devices, providing malware detection on mobile and embedded devices can present additional and unique challenges. While the capabilities of such devices have increased (as their dimensions decrease), resources can still be limited compared to more robust desktop and server environments. Additionally, these devices have, in many instances, been developed to support quickly returning to full operation following an extended hibernation and consumers have, in many instances, come to expect such at-a-moments-notice availability from their device. Such expectations and designs, however, can preclude lengthy antimalware content updates upon restart as has become commonplace with many traditional security solutions. Additionally, the comparatively streamlined processing power of mobile computing devices makes the deployment of resource-heavy antimalware solutions potentially even more problematic and burdensome than with traditional desktop and server-based systems and device. Even on robust traditional devices, in some instances, traditional antimalware solutions can rely upon databases of malware definition files and other content to recognize and remediate malware that push the limits of what can be supported on many host devices. Other issues and challenges also exist beyond the above examples with respect to traditional tools and solutions for detection and remediation of malware.

Figure 2:
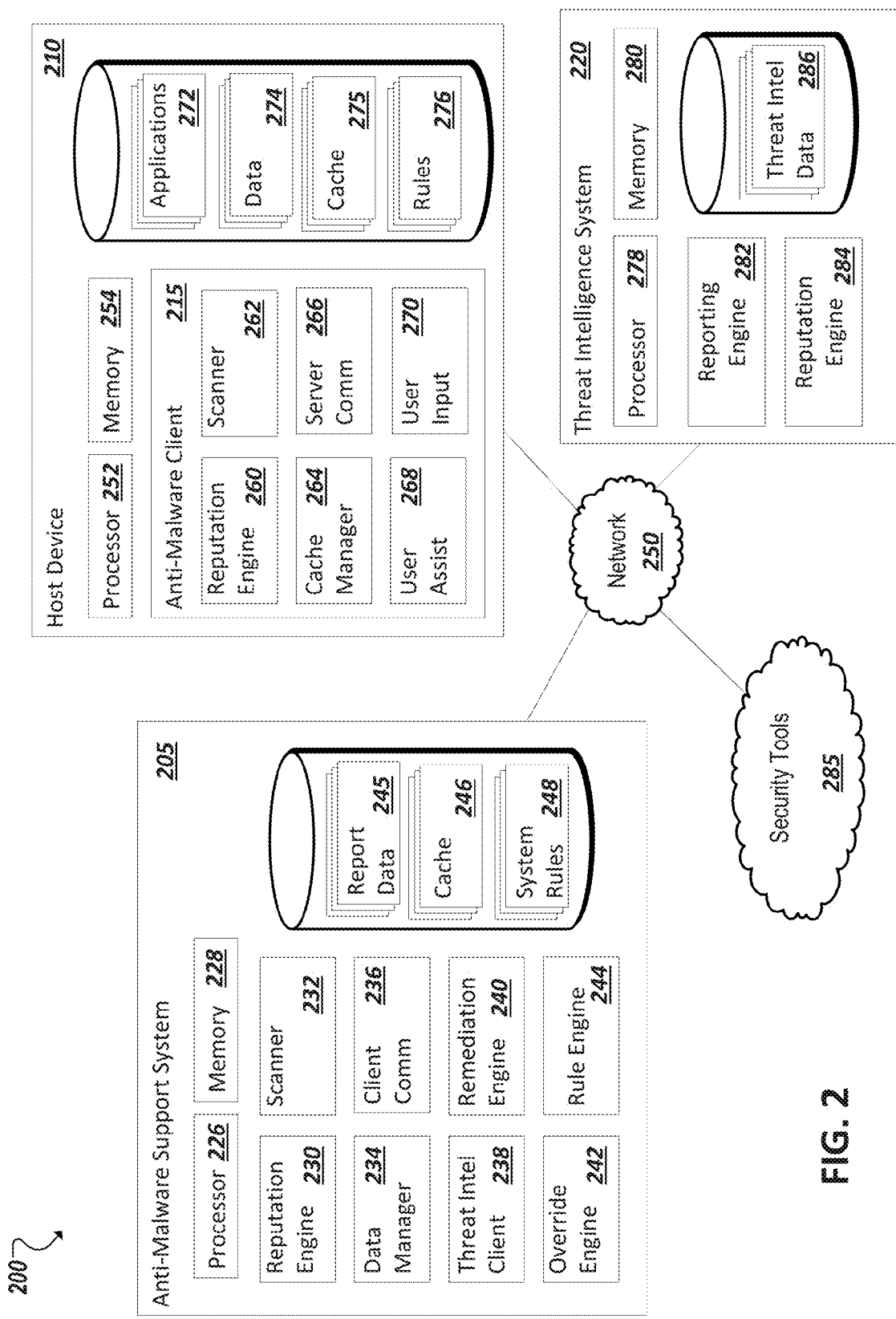
FIG. 2 is a simplified block diagram of an example system including an example antimalware support system in accordance with one embodiment.

In some instances, computing devices can be dedicated to handle the more resource-intensive aspects of antimalware detection and remediation, including the updating of antimalware definitions and content, among other examples, and provide at least a portion of an antimalware solution on behalf of one or more client host devices. The host devices can additionally retain at least a portion of the antimalware solution local on the host device. For example, systems and tools can be provided, similar to those described in the present Specification, that provide these and other benefits and resolve many of the above-described issues in traditional antimalware solutions. For instance, as shown in the example of FIG. 2, a simplified block diagram 200 is shown illustrating a system or computing environment that includes, for instance, an antimalware support system 205, one or more host devices (e.g., 210) each including a respective local antimalware client (e.g., 215), one or more threat intelligence systems (e.g., 220), other security tools (e.g., 225), among other examples, including components and subsystems combining or further dividing functionality of the various subsystems and component described in connection with this particular example.

An example antimalware support system 205 can include one or more processor devices (e.g., 226), one or more memory elements (e.g., 228), as well as one or more logic components implemented in software and/or hardware to provide functionality of the example antimalware support system 205. Such components can include, for example, a reputation engine 230, a scanner 232, a data manager 234, a client communication module 236, a threat intelligence client 238, a remediation engine 240, an override engine 242, and rule engine 244, among potentially additional components and corresponding functionality, as well as components combining (or further dividing) the functionality described in connection with the foregoing examples.

A host device 210 can be one of several host devices making use of antimalware support system 205. Each host device (e.g., 210) can include one or more processor devices (e.g., 252) and memory elements (e.g., 254). Additionally, each host device (e.g., 210) can include a local antimalware client (e.g., 215). In some implementations, antimalware client 215 can be a thin antimalware client. For instance, in some examples, antimalware client 215 can be provided with a minimal subset of antimalware functionality. The subset of antimalware functionality can be selected so as to realize a relatively small footprint on the host device 210 in terms of the antimalware client's 215 demands on memory and processing resources of the host device 210. Further, that subset of antimalware functionality assigned to the host device's local antimalware client 215 can be provided so as to optimize the amount of malware that can be detected and remediated at as low a computing cost as possible or desirable. Antimalware activities that can be performed simply and with relatively little to moderate computing overhead can be configured to be performed by antimalware client 215. Antimalware tasks that are beyond the capabilities and familiarity of the antimalware client 215 can be escalated to a remote antimalware support system (e.g., 205). The remote antimalware support system 205 can include comprehensive, and in some cases, customized, antimalware functionality and resources to address antimalware issues that cannot be effectively handled by the host device's 210 local antimalware client 215.

While all of the antimalware detection and remediation for a given host device could be provided by a remote antimalware support system (e.g., 205) in accordance with the concepts described in the Specification, in some implementations and domains this can be undesirable. In some instances, a purely server-driven antimalware approach can be difficult to scale. For instance, in a large enterprise network employing many host devices (e.g., 210) serviced by a given antimalware support system (e.g., 205), were host devices (e.g., 210) to rely solely on antimalware support system (e.g., 205) for their respective antimalware protection, maintaining an antimalware support system 205 and network resources (e.g., 250) capable of handling such demand may be too expensive. Indeed, over-taxing a server-based antimalware solution can result in performance delays by the server-based antimalware solution. In many cases, delays in the detection and remediation of malware can lead to costly and severe damage to the host device and associated domain. Accordingly, an antimalware client 215 can further possess functionality for addressing malware representing "low hanging fruit" resulting in such malware issues being detected and/or remediated without the involvement of the an antimalware support system (e.g., 205). Additionally, antimalware support systems 205 can employ traffic management techniques so as optimize use of network bandwidth in connection with outbound messages communicated from the antimalware support system 205 to antimalware clients (e.g., 215) supported by the antimalware support system 205, among other examples.

In one example, antimalware client 215 can include one or more components or modules through software and/or hardware for realizing various functionality of the antimalware client 215. For example, an example antimalware client 215 can include such components as a reputation engine 260, scanner 262, cache manager 264, server communication module 266, user assistance engine 268, user input engine 270, among other potential examples and combinations of the foregoing. In one example, antimalware client 215 can include functionality for determining whether or not to allow a particular file to be loaded. A data store, or cache 275, of records can be maintained locally on the host device 210, and can include information for a limited subset of files installed on, accessed by or accessible to, or likely to be encountered by the host device 210, among other examples. The cache 275 can further include descriptions of behaviors and characteristics of the respective files, including, in some cases executable and/or non-executable files. In some instances, the cache 275 can be limited to only executable files, among other examples. The cache 275 can also include reputation data for the respective file or object.

An example reputation engine 260 can be rules- or policy-based and can utilize cache 275 to identify reputation scores for the identified file and/or determine a reputation score based on behaviors or characteristics of the file identified in the cache records, for example. In some instances, characteristics can include whether the file has a certificate or signature. An example reputation engine 260, in some examples, can have access to a local listing of a set of certificates (and/or publishers associated with one or more certificates, such as popular, trusted software vendors) and determine a reputation based at least in part (and in some cases solely) on whether the file is signed with an approved, verified, and/or trusted certificate. That the file is signed with certificate can be insufficient, as some malware is itself issued and signed with certificate. A given certificate may only be included in the local listing if the certificate has been verified as belonging to a reputable vendor, publisher, etc., for instance, based on intelligence gleaned from antimalware support server 205 (and/or threat intelligence system 220). Additionally, a combination of factors, behaviors, and characteristics can be considered by a reputation engine in determining a reputation score for the file or determining whether the file satisfies rules 276 defined for a particular domain (e.g., as communicated, for instance, by antimalware support server 205).

In some instances, antimalware client 215, in addition to possessing simplified malware assessment functionality through reputation engine 260, may additional include simplified scanning functionality through, for instance, an example scanner 262. Scanner 262 can include functionality for identifying, from the file, whether the file possesses one or more pre-defined behaviors capable of being discovered from the binary file by scanner 262. Scanner 262 may be limited to identifying only a subset of more easily discoverable executable file behaviors in one example. A scanner 262 can be used by antimalware client 215, for instance, to scan a file prior to the loading of the file, to attempt to discover behaviors of the file. Behaviors discovered for the file can be documented in cache 275 and further considered by reputation engine 260. Such discovered behaviors can be the basis for approving or denying, at antimalware client 215, whether the file has a satisfactorily trustworthy reputation and can be loaded.

In some implementations, antimalware client 215 can utilize a series or hierarchy of assessments and scans in an attempt to more quickly and efficiently conclude whether a particular should be loaded or not on the host device 210. More resource intensive operations of the antimalware client 215 can be postponed in the event less resource intensive operations (performed first) prove conclusive. Additionally, if the antimalware assessment functionality of the antimalware client 215 is exhausted for a given file, the antimalware client may then escalate assessment and handling of the file to the antimalware support system 205 for the domain. In one example, antimalware client may first attempt to determine whether the file is known and whether a determinative assessment has been made regarding the file and its reputation (together with a confirmation that the file has not been modified since this assessment). If the cache 275 records reveal determinative information concerning the file, the antimalware client 215 can correspondingly act to either conclusively permit or deny loading of the file on host device 210 consistent with the information described in the cache 275. However, if cache record are at least partially inconclusive, antimalware client 215 (e.g., using reputation engine 260) can move to a second assessment, such as an attempt to identify a certificate of the file and determine whether the certificate is one previously identified as trusted (or even untrusted). Additional features of the file can also be determined if earlier assessments have proven inconclusive, including determining behaviors of the file (e.g., using scanner 262) and the reputation engine 260 can determine whether a combination of the discovered traits violate or satisfy a given rule (e.g., 276) so as to conclusively allow or block the file.

As an example, assessments of a particular file by the antimalware client 215 can conclude that there is no record of the file, that a certificate of the file is neither known to be trusted or untrusted, and that the file is a packed file. In this particular example, rules (e.g., 276) for a particular domain can define that such a combination of features should not be allowed to be loaded on the host device 210. Further, the antimalware client 215 can send a copy of the file along with information gathered for the file to the antimalware support system 205 for more information. A query to the antimalware support system 205 can yield results that, in some cases, then allow the file to be loaded on the host device 210 (e.g., based on an assessment by the antimalware support system 205 that the file is not malicious and can be trusted).

As discussed above, when an antimalware client 215 is able to sufficiently assess files for malware using the subset of information and functionality provided, the antimalware client 215 can spare the involvement of the antimalware support system 205 for queries by other antimalware clients (or security tools) in the domain, including on other host devices within the domain. Indeed, in some implementations, an antimalware support system 205 can provide support to a multitude of host devices. Further, as noted above, in some instances, the antimalware client 215 can communicate with the antimalware support system 205 (e.g., over one or more networks 250 utilizing server communication module 236) in connection with the assessment of one or more files detected at the host device (e.g., 210). In some instances, the antimalware client 215 of a host device 210 can determine that it possesses insufficient information to definitively determine whether a particular file should be loaded on the host device. In some instances, the host device 210 can query the antimalware support system 205 for additional intelligence or to apply additional scanning or assessment functionality available at the antimalware support system 205. Such a query can include information detected by the antimalware client 215, such as behaviors of the file, an identification of a detected publisher of the file, a URL associated with the file (e.g., a source of the file), the type of file, a certificate of the file, among other examples of basic information identifiable using the antimalware client 215.

An antimalware support server 205 can utilize information received from an antimalware client 215 to both attempt to generate a response to the antimalware client 215 as well as supplement its own records (e.g., cache 246). As antimalware support system 205, in some examples, will support multiple host devices and antimalware clients, including various types of host devices (and/or antimalware clients), antimalware support system 205 can obtain a wealth of information from the supported devices as they submit queries for assistance or simply report the identification of files, changes to files or file behaviors, etc. that are inconsistent with the respective hosts' previous cache records (e.g., 275). Further, some host devices may possess functionality that other host devices served by an antimalware support system 205 do not. For example, some devices may possess hardware-based scanners that are capable of identifying file behaviors and characteristics at the processor level (e.g., below the operating system level), that other host devices may not be able to detect (e.g., because they utilize different chipsets not employing such technology). However, characteristics identified by any one host device (or corresponding antimalware client) can be effectively used by every other host device within the domain as the antimalware support system 205 sources file information from each of the various host devices it supports. For instance, a query by a first host device that is unable to detect a certain behavior of a particular file can query the antimalware support system 205 for additional information or assessment of the particular file. The antimalware support system 205 may have obtained additional information for the particular file from another host device in the domain and can apply this information in addressing the query of the particular host device, among other examples.

An antimalware support system 205 can obtain a variety of information for use in assessing potential malware detected by anyone of a variety of antimalware clients on host devices within the domain supported by the antimalware support system 205. For example, in addition to developing crowd-sourced, or collaborative, intelligence about the variety of files encountered by the hosts in its domain, the antimalware support system 205 can additionally collect, generate, and use further statistical and heuristic information that can be the basis for a reputation score or other assessment. For instance, an antimalware support system 205 can collect first contact information identifying the date and conditions of a particular file (e.g., by a particular host device) within the domain. This information can be used, for instance, to track the development, evolution, or spread of a particular file within the domain, among other examples. Additionally, prevalence data can be generated and maintained by the antimalware support system 205 documenting the frequency that a particular file or event is detected by antimalware clients in the domain. In some instances, the prevalence of a particular file or event can serve as an additional data point for assessing the likelihood that the file or event corresponds to something malicious. As an example, in some instances, a file having zero prevalence (i.e., detected on only a single host) can be evidence of a polymorphic malware, when combined with other characteristics determined for the file (e.g., by the antimalware client and/or antimalware support system). In another example, high prevalence of a file can also be incorporated within an assessment of a file or event as malicious or trustworthy, among other examples.

An antimalware support system 205 can respond in a variety of ways to a received query (or other data) from an antimalware client (e.g., 215). For instance, as antimalware clients 215, in some examples, may possess a relatively limited subset of information available (e.g., at the antimalware support system 205) concerning various files, file certificates, file behaviors and characteristics, etc., a query by an antimalware client 215 may seek to obtain any additional intelligence available at the antimalware support system 205. Such queries can be responded to in substantially real time with little delay to the antimalware client. For example, in response to a query for more information about a particular file, an antimalware support system 205 can return additional information concerning behaviors detected for the file by other antimalware clients, from threat intelligence system 220, or another source. The antimalware client 205 can utilize this additional information to performed a more complete assessment of the file (e.g., using reputation engine 260) based on the rules 276 driving the assessment to finally determine whether to allow or deny loading of the particular file, among other examples.

In some instances, an antimalware support system 205 can perform a reputation assessment (e.g., using a more robust reputation engine 230) on behalf of the antimalware client 215 in response to a query of the antimalware support system 205 in connection with a particular file detected at the host device 210. As noted above, antimalware support system 205 can have access to additional information, including trend, heuristic, and aggregated data, and can generate a reputation score of the particular file based on this information together with any information provided by the antimalware client 215 or described for the file in the antimalware support system's 205 own cache. The antimalware support system 205 can then return the reputation assessment result to the antimalware client 215 prompting the antimalware client to act on the information, as well as update its own cache records 275 (e.g., using cache manager 264) based on the feedback received from the antimalware support system 205. Upon updating its cache 275 to reflect the information obtained from the antimalware support system 205, future encounters with the file can be handled simply at the antimalware client 215 by identifying the previously determined reputation information in the cache 275 (e.g., provided the character of the file has not been modified since the initial encounter and assessment, etc.).

In still other examples, an antimalware support system 205 can receive a query from an antimalware client (e.g., 215) for a particular file which even the antimalware support system 205 is unable to conclusively assess. While between the combined functionality of the antimalware client 215 and antimalware support system 205 (with additional support and intelligence of a threat intelligence system 220) much of the files identified at hosts (e.g., 210) within the domain can be definitively categorized as safe (or "white") or unsafe, untrustworthy, or "black," still other files, such as files newly discovered on the domain, may remain somewhere in between, or "gray." In some instances, an antimalware support system 205, upon concluding that a particular file is gray can report this information to the antimalware client 205. In some instances, depending upon the rules (e.g., 248, 276) set for a domain, a gray file may be automatically blocked at the host device, while in other instances, a determination that a file is gray may result in a user of the host device 210 (or administrator of the domain) being given the option of loading the file despite this finding, among other examples.

In some instances, if neither the antimalware support system 205 nor the antimalware client 210 can resolve the reputation of a particular file (including, in some instances, with the additional assistance of threat intelligence system 220) using information already available to the respective systems, antimalware support system 205 can make use of scanner utilities (e.g., 232) available to it to perform deeper analyses and scans of the file. In traditional systems, a file that could not be resolved may have been sent to another vendor for analysis. In some implementations of an antimalware support system 205, a scanner 232 can be provided that can scan the file, for instance, by allowing the file to be loaded and/or executed in a sandbox or other virtual or protected environment and scanned to assess the various behaviors and potential maliciousness of the file, among other examples. Once a scanner 232 returns some results for the file, the antimalware support system 205 can communicate this additional information to the antimalware client 215 to update the cache 275 of the antimalware client 215, among other examples.

As noted above, in some examples, a user can be presented with an option as to how to handle a particular file, website, event, etc. encountered on a client device. Such functionality can be expanded beyond decisions of whether to allow a particular file to be loaded or not in connection with an assessment involving at least antimalware client 215. For instance, allowing a file to execute, make changes to other files, install files, add data to memory, access particular online resource, etc. can cause a user of the host device to be prompted (e.g., using user assistance engine 268) for permission to being/continue the operation. Some traditional downloaders and other tools may ask users for permission through a presentation of interactive prompt, however, users are often left to their own devices in determining the appropriate response to the prompt. The more cautious or capable users may attempt to scour the internet for information regarding the risks inherent in granting permission in response to such a prompt, although such efforts can not only be inconvenient but reliant on potentially irrelevant, outdated, or incorrect information, among other potential issues. In some implementations of an example antimalware client 215, user assistance engine 268 can identify events that trigger presentation of a permission prompt for the user. In connection with such a permission prompt, the user assistance engine 268 can query cache 275 as well as, in some instances, antimalware support system (or even a threat intelligence system 220) for additional intelligence regarding the nature and potential risks associated with the event for which permission is requested. For instance, the permission prompt can identify that a certificate of a file associated with the event is trusted/untrusted/unknown, can identify that the event is the first detected of its kind (e.g., a first contact event of the domain), involves a file capable of performing a particular set of behaviors, involves a file, URL, publisher, vendor, etc. with a particular computed reputation score, among other examples. The user can elect to utilize this data (or even have this data presented to them if they are interested) in connection with a decision to grant or deny permission of the event.

In addition to providing information to a user in connection with user-driven permissions or actions based on collective intelligence derived from an antimalware support system 205, in some examples, an example antimalware client 215 can additionally capture the response of a user to a particular event, including permission prompts, and report this feedback to the antimalware support system 205 (e.g., using user input engine 270). Such user-provided intelligence can be used by antimalware support system 205 to further supplement the intelligence it collects about particular files, events, URLs, publishers, etc. and uses to provide antimalware support to antimalware clients in the domain. Additionally, in addition to cumulating and crowd-sourcing intelligence from the multiple antimalware clients it serves, the antimalware support system 205 can additionally crowd-source information based on the variety of user feedback it receives, such as users' responses to various prompts, including prompts serviced by example user assistance engines (e.g., 268). Further, this user-based intelligence can be delivered for use by example user assistance engines (e.g., 268). For instance, a user assistance engine 268 can present, along with detected characteristics of a file or event, a summary of how other users responded to the prompt. For instance, a permission prompt can identify, as an example, that 23% of users in a domain granted permission for an event based on a similar permission prompt, potentially evidencing to the current user that they should respond in kind, among potentially many other examples.

Occasionally, in some implementations, rules (e.g., 276) as well as records and information in cache 275 concerning one or more files can be updated. For instance, the cache (e.g., 275) of a particular host-based antimalware client 215 may be incomplete or out-of-date. As the corresponding antimalware support system 205 may be constantly identifying new files and associated file intelligence from other antimalware clients in the domain as well as through threat intelligence system 220, in some instances, it can become prohibitively expensive for the antimalware support system 205 to be continuously broadcasting any and all such updates to all of the potentially many host-based antimalware clients serviced by the antimalware support system 205 in the domain. In some implementations, such updates can be tailored to each antimalware client and be performed at least partially in an opportunistic manner. As an example, antimalware support system 205 as it receives communications from various host devices concerning various files encountered on the host devices (e.g., 210), the antimalware support system 205 can correspondingly record that the respective files reside on or have some other relevance to the host devices submitting queries or reporting information about them. Through records (e.g., 246) associating files with various host devices (e.g., 210) in the domain, the antimalware support system 205 can correspondingly filter what update information is sent to each host device. The antimalware support system 205 can maintain or otherwise access (e.g., from an asset management system of the domain (not shown)) other information for the host devices in the domain to further discover whether particular information and updates are relevant to the host devices. Indeed, such information can be used when first provisioning a subset of file records and other data in cache 275 customized for use by the antimalware client 215 in addressing those files, events, and issues most likely to be encountered at the host device 210.

An example antimalware support system 205 can further time communications and updates for various host devices opportunistically. For example, rather than broadcasting a particular update (e.g., of file behavior information, among other examples) to the set of antimalware clients to which the update is likely relevant, the antimalware support system 205 can seek to piggyback such updates on other responses to or communications with the host device so as to maximize the bandwidth consumed in such communications. As an example, an antimalware client 215 can query antimalware support system 205 for more information concerning a particular file (if available). In response, the antimalware support system 205 can identify that the query is from the antimalware client 215 of host device 210 and further determine whether the antimalware support system 205 has any updates for the antimalware client 215 since the last time an update was issued. Indeed, antimalware support system 205 can maintain, for each antimalware client it supports, a queue of updates that should be delivered during the next opportunity to communicate with the antimalware client. Continuing with the previous example, in addition to providing a response to the query with additional information about the particular file, the antimalware support system 205 can additionally provide update information for the antimalware client (e.g., for use in updating cache 275), including update information for files and events other than the particular file that was the subject of the query.

While opportunistic updating can be employed by an antimalware support system 205, such as in the examples above, in other instances, antimalware support system 205 may push at least some of the updates to corresponding antimalware clients (e.g., 215). For instance, if a particular threshold time has expired since a last update, the antimalware support system 205 can push updates to the antimalware client 215, for instance, the next time the host device is started or otherwise available on the network, etc. Further, a subset of the updates can be identified as high priority updates and these can be pushed to their respective antimalware clients according to a shorter threshold time or immediately, among other examples. Further, in still other examples, some update information can be broadcast to two or more antimalware clients serviced by the antimalware support system 205, for instance, to report a change to a rule (e.g., 276) to be applied by the particular antimalware client, among other examples.

As updates are received identifying new or updated characteristics of file already identified in cache 275 or as new files are identified, a cache manager 264 of antimalware client 215 can update the cache 275. While in traditional antimalware tools content and caches can expire and the entirety of the cache is replaced, for instance, on a daily basis, to ensure that the cache remains current, the cache 275 managed by antimalware clients (e.g., 215), in some examples, can be piecemeal and selective, such as in response to specific update information affecting only a subset of the records in the cache 275. Additionally, rather than replacing the entirety of the cache 275 or even a single record of the cache 275, particular metadata of a cache record describing such characteristics as a file's certificate, behaviors, reputation score, etc. can be maintained persistently until an update is received (or additional characteristics are identified locally using antimalware client 215), allowing for precision in updating only those particular elements of the record based on the update information received. This can, among other potential benefits, allow for more economical updating of the cache 275 both in terms of network traffic for coordination of updates with an antimalware support system 205 and processing overhead at the host device 210, which, in some cases, may be a mobile computing device or other computing device with more streamlined or focused processing capabilities or design.

In some implementations of a thin antimalware client (e.g., 215), remediation functionality can be provided to remediate certain subsets of detected malware at the host device 210. In other instances, an example thin antimalware client can be focused on deciding whether a particular file (executable and/or non-executable) should or should not be loaded, executed, etc. based on whether the particular file satisfies rules defined for the host device (e.g., 210) and/or domain. More robust remediation functionality can be provided through antimalware support system 205 (e.g., through remediation engine 240). In one example, antimalware client 215 can request remediation of a particular issue discovered on or relating to the corresponding host device 210, including issues identified by the antimalware client 215 alone or with assistance of the antimalware support system 205. The antimalware support system 205, in such instances, can identify a corresponding remedy for the issue and cause the remedy to be applied to the host device 210.

For instance, in one example, a library of remediation scripts or tools can be maintained at the antimalware support system 205. In traditional antimalware tools, such a library of tools may have been attempted to be incorporated within the host-based tool itself, to the extent providing a full library of available antimalware remediation functionality was possible given memory and processing constraints of the host device. In one example implementation, the antimalware support system 205 can identify one or more remediation scripts as candidates for remediating a particular identified issue at the host device. The selection of the particular remediation scripts can be based, in some examples, on feedback received from similar other host devices in the domain regarding the effectiveness of the remediation scripts, among other examples and considerations. The antimalware support system 205 can then send the selected remediation scripts to the antimalware client 215 on the host device 210 for use (e.g., in connection with other logic on antimalware client 215 capable of executing or otherwise using the functionality of such scripts) by the antimalware client 215 to remedy the issues at the host device 210. Once remediation of the issues is confirmed (e.g., in some instances, based on a query of the antimalware support system 205 for confirmation or through further operations of the remediation script), the antimalware client 215 can dispose of the received remediation scripts to reserve resources for potentially other scripts that may be used in the future by the antimalware client 215 to address other malware issues. In a sense, the antimalware remediation script can be considered, in some implementations, as a dissolvable tool that is used and then disposed of by the antimalware client 215, among other examples. As other malware issues are encountered, the antimalware client 215 can send subsequent requests for remediation to the antimalware support system 205 and can be provided with other remediation scripts from the antimalware support system's library that correspond to the other malware issues, and so on.

In other, or supplemental, implementations, a remediation engine (e.g., 240) of the antimalware support system 205 can perform at least a portion of the remediation of a malware issue on a host device (e.g., 210) at the antimalware support system 205. For instance, in one example, remediation engine 240 can include a virtual machine or virtual environment that permits weightier remediation processes to be run within the virtual environment on behalf of and to remediate the issue on the host device 210. For example, a filter driver of the virtual environment (or antimalware support system 205) can intercept certain operations instantiated and run from the virtual environment and redirect the operation to the host device so that the logic is executed within the virtual environment but the operations are performed on the host device (i.e., rather than the virtual environment). In some instances, a variety of antimalware tools and processes can be run within the virtual environment, including a battery of normally incompatible or redundant processes, such as a battery of antimalware remediation processes provided by different third-party vendors. Such a set of remediation processes can be each run in series within virtual environments provided through the remediation engine 240, and can be predefined as a recipe for addressing certain malware issues by the antimalware support system 205, among other examples.

In still other examples, a remediation engine 210 can be used to launch or initiate certain processes remotely on the host device 210 in connection with a remediation diagnosis of one or more particular malware issues discovered and/or reported on the host device. For example, a remediation step can include, in some instances, remote rebooting of the host device, calls through an API to one or more hardware-based security or system management services available through a chipset of the host device 210 (including services that may allow access to the host device when disabled or when the operating system is not operational, among other examples), among other potential examples. Such remotely-invoked remediation steps can be paired with other remediation operations including remediation operations served in virtualized environments provided by remediation engine 240 or remediation scripts provided by the remediation engine 240 for local execution on the host device, among other examples utilizing remediation assistance functionality of the antimalware support system 205. Further, as noted above, feedback data can be collected reporting the effectiveness of various remediation techniques managed by the antimalware support system 205 for a particular host device 210 and this feedback can be used as the basis of selecting (or not selecting) certain remediation techniques in connection with subsequent efforts by the antimalware support system 205 to assist with the remediation of similar malware issues on other host devices within the domain, among other potential features and benefits.

As noted above, malware detection and assessment at an antimalware client (e.g., 215) in example environment 200 can be rules- or policy-based. Rule definitions (e.g., 276) can be maintained locally at the host device 210 for use by the antimalware client 215. Such rules can be provided by and updated according to system rules 248 maintained by the antimalware support system 205. Some rules 276 at the host device 210 can be tailored or be specific to the host device 210, such as rules that are specific to the particular functionality, feature, make, model, etc. of the host device 210. In other words, the rules 276 maintained at a host device 210 may only be a subset of the rules (e.g., 248) maintained for an entire domain by the antimalware support system 205. Additionally, updates sent to the host device 210 may be tailored to updating the particular subset of rules relevant to the host device, among other examples.

In some instances, a particular host can migrate between multiple different domains, such as a work, school, and/or personal domain, or network. Such scenarios are becoming increasingly common with the increased mobility of personal computing devices and the acceptance of bring your own device (BYOD) policies by employers and other institutions. In some instances, a single antimalware client (e.g., 215) of a host device 210 can be configured to determine what domains are applicable to the host device 210 at a particular instant, such as based, for instance, on networks with which the host device 210 can detect or access, geolocation data, and a sign-on to the network, etc. Further, multiple different rule sets can be maintained by the antimalware client 215 for the host device 210 for each of the domains to which the host device 210 is known to associate with and communicate in. The antimalware client 215 can identify the rule set(s) (e.g., 276) that it is/are to apply, as well as the respective antimalware support systems with which the antimalware client is to communicate and operate based when within the respective domain. Indeed, in some instances, an antimalware client 215 can determine that a host device is within, logically or physically, two or more domains simultaneously, and can apply rules from each domain to the extent possible, among other examples.

In some implementations, an antimalware support system 205 may possess functionality (e.g., through rule engine 244) to custom-define and tailor rules 276 to a particular domain. The data (e.g., 274) and applications (e.g., 274) hosted within a given domain can vary widely together with the goals, risk tolerances, and character of the business, educational, governmental, non-profit, or personal entity. Traditional antimalware tools utilize a predominantly one-size-fits all model, representing in some cases, the antimalware tools' goal to detect and potentially remediate any and all malware that a given host or domain may potentially be exposed to. However, what may not be regarded as malware by some can be regarded as malware by others, and what may be considered as safe by some may be regarded as untrustworthy by others, and so on. Further, some objects and files may possess many characteristics commonly shared with malware, such as packed files, among other examples. As a result, some antimalware products employ under-inclusive (or over-inclusive) algorithms for categorizing files as malware or not, among other potential deficiencies. An administrator of a domain, using antimalware support system 205 may be able to custom define rules for defining how to classify files as malicious, trusted, unknown, mixed, etc. In some instances, a default set of rules can be provided and rule engine 244 can be used to tailor exceptions, exclusions, and other customizations of the domain's rule set using the default set as a starting point, among other examples.

Further, an example antimalware support system 205, in some instances, can consumer data from one or more threat intelligence systems 220 collecting and processing security data across multiple different domains and from multiple different types of security tools (e.g., 285) monitoring various aspects of those domains. Such security tools 285 can include, among other examples, other antivirus and antimalware tools, host intrusion protection systems, network intrusion protection systems, web gateways, email gateways, intrusion detection systems, data-leak prevention systems, firewalls, whitelist/blacklist managers, and other host- and network-based security tools within multiple different domains.

Example threat intelligence systems (e.g., 220) can include one or more processor devices (e.g., 278), one or more memory elements (e.g., 280), among one or more hardware and/or software-based components, such as, for example, a reporting engine 282 and reputation engine 284, among other potential examples and combinations of the foregoing. In some instances, threat intelligence systems 220 can provide intelligence (e.g., through reporting engine 282) that identifies various threats, including malware, detecting among the various domains and systems providing the threat intelligence system 220 data. Indeed, antimalware support system 205, antimalware clients (e.g., 215), and other security tools of a domain can also supply data to one or more threat intelligence systems (e.g., 220) in some examples. A reputation engine 284 can be used to apply certain global classifications to the information collected and reported by the reputation engine 284. In some instances, however, threat intelligence systems 220 can also suffer from issues of being over-inclusive, under-inclusive, too conservative, or too liberal, etc. in their reporting and characterization of information it receives. For instance, files, events, sources, etc. that are considered malicious to a particular domain but not necessarily to others may be completely (or at least partially) omitted or inadequately characterized in intelligence data served (e.g., to antimalware support system 205) by the threat intelligence system 220. Further, some threat intelligence data may be regarded differently by the domain such that it can be ignored. Additionally, data collected within the domain, for instance, from antimalware clients (e.g., 215) monitoring various hosts in the domain, may be used to supplement the threat intelligence feed received from a threat intelligence system 220, among other examples.

In some example implementations, antimalware support system 205 can include an override engine (e.g., 242) or other functionality (e.g., provided through rule engine 244) adapted to tailor threat intelligence data received from one or more threat intelligence systems (e.g., 220) according, for instance, to one or more preferences (and/or rules (e.g., 248)) of the domain. For instance, exceptions can be defined for threat intelligence data (e.g., 286) generated and served by threat intelligence systems (e.g., 220) to exclude certain types of information, such as information that is based on rules or assumption not adopted by the domain or relating to events, objects, URLs, publishers, etc. that the domain considers trustworthy. Further override engine 242 can additionally supplement or modify reputation scores and other data received from the threat intelligence systems (e.g., 220) to account for particular characteristics, files, or issues unique to or otherwise of interest to the domain, among other examples.

Figure 3:
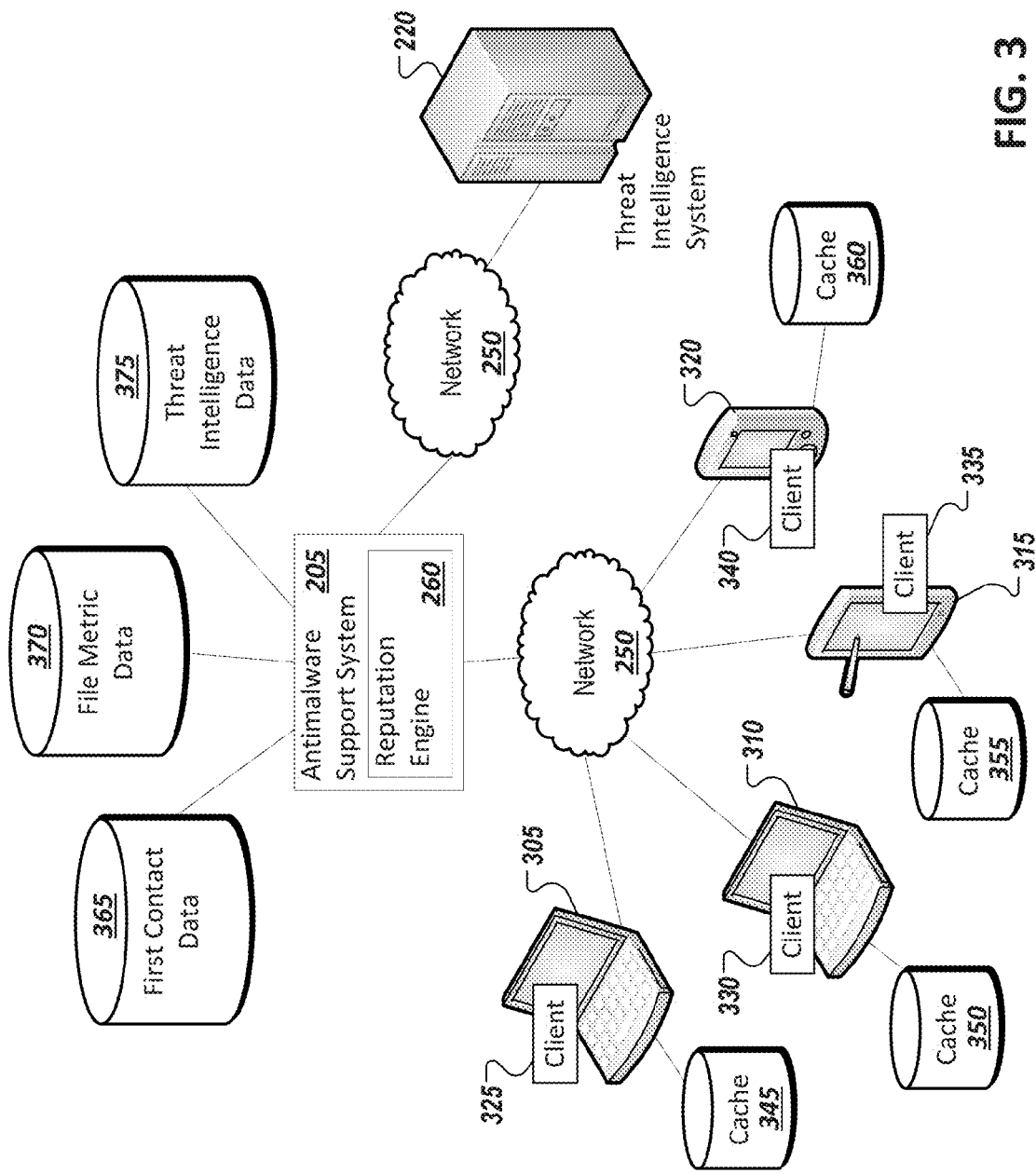
FIG. 3 is a simplified block diagram representing additional aspects of an example system including an example antimalware support system in accordance with one embodiment.

Turning to FIG. 3, a simplified block diagram is shown illustrating an example computing environment including antimalware support system 205 of a domain including multiple host devices 305, 310, 315, 320. Each host device (e.g., 305, 310, 315, 320) can include a respective antimalware client (e.g., 325, 330, 335, 340) that utilizes a respective local cache (e.g., 345, 350, 355, 360) of the host device in connection with preliminary assessments of files on the host device. Antimalware support system 205 can send updates to the various hosts (e.g., 305, 310, 315, 320) it services within the domain and the hosts (e.g., 305, 310, 315, 320), in some cases, through their respective antimalware clients (e.g., 325, 330, 335, 340) can update their respective local caches (e.g., 345, 350, 355, 360) in response to the update.

In one example implementation, antimalware support system 205 can maintain reputation data that it can use to generate reputation assessments for files encountered (e.g., by antimalware clients 325, 330, 335, 340) in the domain as well as develop update data to be distributed to the host devices 305, 310, 315, 320 in the domain. In one example, antimalware support system 205 can include first contact data 365, file metric data 370, threat intelligence data 375, among other potential examples. Further, it should be appreciated that the foregoing data can be combined and included in a single or multiple different records maintained by the antimalware support system 205 for the file, among other examples.

Example first contact data 365 can identify the instance, within the domain, when a file was first identified within the domain. First contact data 365 can be associated with the file, including a hash of the file or other identifier of the file. Further, first contact data can identify when and how the file was first encountered, such as by a particular host device in the domain. Accordingly, in such examples, first contact data can identify the host device that first encountered the file, as well as describe characteristics of the first contact (e.g., as described in data reported by the host device, such as collected by the host's antimalware client).

Example file metric data 370 can describe characteristics of a file known to antimalware support system 205. Such characteristics can include an identification of the file's certificate, publisher, behaviors, etc. Further, file metric data 370 can include statistical data, prevalence data, URLs, IP addresses, and other information describing the file's presence or entry within the domain. Antimalware support system 205 can update and supplement file metric data as additional information is obtained from the variety of host devices (e.g., 305, 310, 315, 320), for instance, in connection with queries received from antimalware clients (e.g., 325, 330, 335, 340). File metric data 370 can be based on feedback data for a file as detected and analyzed by multiple different host devices within the domain. As the functionality of host devices 305, 310, 315, 320 in domain can vary in terms of what characteristics can be detected on the host device 305, 310, 315, 320 as well as the contexts or host device uses in which the characteristics are detected, pooling information detected at these devices can assist in making file metric data 370 maintained by the antimalware support system 205 more comprehensive. File metric data 370 (along with other data describing files maintained by antimalware support system 205) can also be indexed by a corresponding file identifier, such as a hash of the file or other identifier.

Antimalware support system 205 can consume threat intelligence data served by threat intelligence system 220. Threat intelligence data can be based on observations of multiple different sensors collected from multiple domains. Antimalware support system 205 can maintain threat intelligence data 375 based on the information obtained from threat intelligence system 220. In some instances, antimalware support system 205 can apply domain specific rules, preferences, and/or exceptions to threat intelligence data received from a threat intelligence system 220 to bring the data more into accordance with the antimalware rules and domain-specific conditions within the domain. In some instances, threat intelligence data can be further indexed by file, in some instances, describing files outside of the set of files discovered within the domain, among other examples.

Antimalware support system 205 can utilize combinations of first contact data, file metric data 370, threat intelligence data 375, among other data collected and generated through information obtained from the host devices 305, 310, 315, 320 and threat intelligence system 220 to assess reputations of the respective file. A reputation assessment can involve applying domain-specific (or domain-wide) rules to the file's data (e.g., 365, 370, 375) maintained by the antimalware support system 205. A reputation score can be generated by the antimalware support system 205. Reputation assessment data describing the reputation assessment of the antimalware support system 205 can be generated and associated with the file and maintained by the antimalware support system 205.

Antimalware support system 205 data (e.g., 365, 370, 375) describing a file may be more complete and/or up-to-date than corresponding data for the file maintained at any one of the local caches (e.g., 345, 350, 355, 360) of host devices 305, 310, 315, 320 in the domain. Indeed, antimalware support system 205 can maintain data for files not identified or included in the local caches 345, 350, 355, 360 of host devices 305, 310, 315, 320. In some implementations, a host device may limit the file data maintained at the host device's local cache to those files already detected at the host device. Accordingly, antimalware support system 205 can provide updates to the local caches of the host devices on an as-needed basis, in some instances, and in response to the host device detecting a file described in the antimalware support system data (e.g., 365, 370, 375), among other examples.

Figure 4:
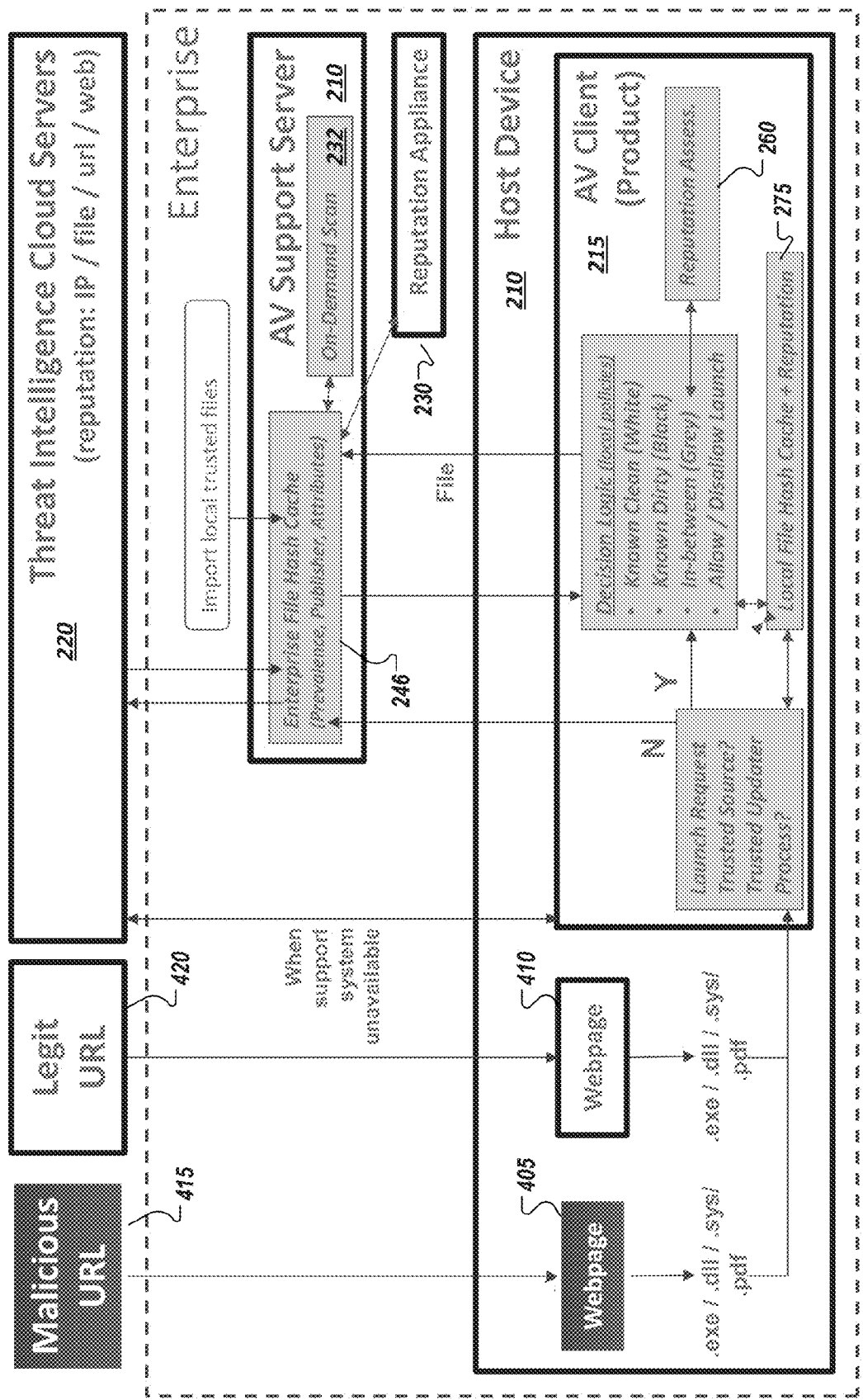
FIG. 4 is a simplified block diagram representing interactions between an example antimalware support system, example antimalware client, and example threat intelligence service in accordance with one embodiment.

Turning to FIG. 4, a simplified block diagram is shown representing example functionality of an antimalware system including an antimalware (or antivirus) support system 205, an antimalware thin client 215 operating locally on a host device 210, together with one or more threat intelligence systems (e.g., 220). In the example of FIG. 4, antimalware client 215 can encounter a variety of files (e.g., 405, 410), including files originating from external sources, such as web servers (e.g., 415, 420). For instance, a file 410 can be detected by the antimalware client 215, and antimalware client 215 can apply the subset of detection and assessment provisioned on it to make a cursory assessment of the file 410. For instance, antimalware client can assess whether the source (e.g., 420) of the file 410 (or process associated with or provided through the file, such as an updater process) is trusted or not. Such a trust assessment can be based on identifying a certificate of the file 410 and comparing the certificate against, in some cases, a focused or limited listing of trusted certificates. In some implementations, at least a portion of a listing of trusted URLs, IP addresses, or other source information (e.g., 415, 420) determined for the domain can be available locally at the host device to further assist in assessing (e.g., in combination with the certificate listing) whether the source is to be trusted. If the antimalware client 215 possesses the requisite functionality to identify sufficient information from the file as well as access local data describing features of the file, including the file's source, the antimalware client 215 can apply rules, such as domain-specific rules, to determine whether to regard the file (e.g., 410) as known clean, known dirty, or grey, and whether to allow or disallow launch or loading of the file (e.g., using a reputation assessment engine (e.g., 260)). Additional information can also be assessed for the file 410, such as behaviors of the file and other information, for instance, identified from a local file cache 275 of the antimalware client 215 among other examples.

In instances where decision logic of the antimalware client 215 determines that it is unable to satisfactorily assess a file (e.g., 405, 410) based on its thin functionality set (or the focused content set (e.g., 275) available to it), antimalware client 215 can possess additional logic to query outside sources for assistance. For example, antimalware client 215 can engage antimalware support server 210, or, in cases when antimalware support server 210 is down or otherwise unavailable, query a threat intelligence system 220 in some examples.

Antimalware client 215 can assemble what information it can for a detected file and send this information to antimalware support system 210 as a query for additional intelligence. In some instances, all the antimalware client 215 may be able to provide is a hash of the file, while in other instances, functionality of antimalware client 215 may be able to assemble additional data describing various aspects of the file, such as whether or not the file was signed (or had a certificate), an identification (or copy) of any certificate, behaviors detected for the file, other information identifying a source of the file (e.g., a URL or IP address, etc.), among other information in accordance with the limited subset of functionality provisioned on the antimalware client 215.

Using at least the identification (e.g., a secure hash algorithm (SHA) hash) of the file, the antimalware support system 205 can attempt to identify additional information known concerning the file, including information described in file records or cache (e.g., 246) maintained by the antimalware support system 205, such as first contact data, file metric data, threat intelligence data, reputation score data, etc. As discussed above, antimalware support system can further utilize information obtained from the antimalware client 215 in its query in combination with the antimalware support system's own data describing the file to conduct a reputation assessment (e.g., using reputation engine 230) in connection with the query, among other examples. The antimalware support system 205 can return results for the query including additional information known for the file at antimalware support system 205 as well as reputation assessment data generated by the antimalware support system (or even reported by threat intelligence service 220). The antimalware client 215 can utilize this information (including consideration of the antimalware support system's (and/or threat intelligence system's) reputation assessment) to decide whether to launch or disallow the file locally at the host device 210. Further, in some instances, in connection with the decision to launch or disallow the file, antimalware client 215 may additionally process the various data (e.g., reputation data) returned in the query and complete its own reputation assessment (e.g., generation of a reputation score), among other examples.

Figure 5:
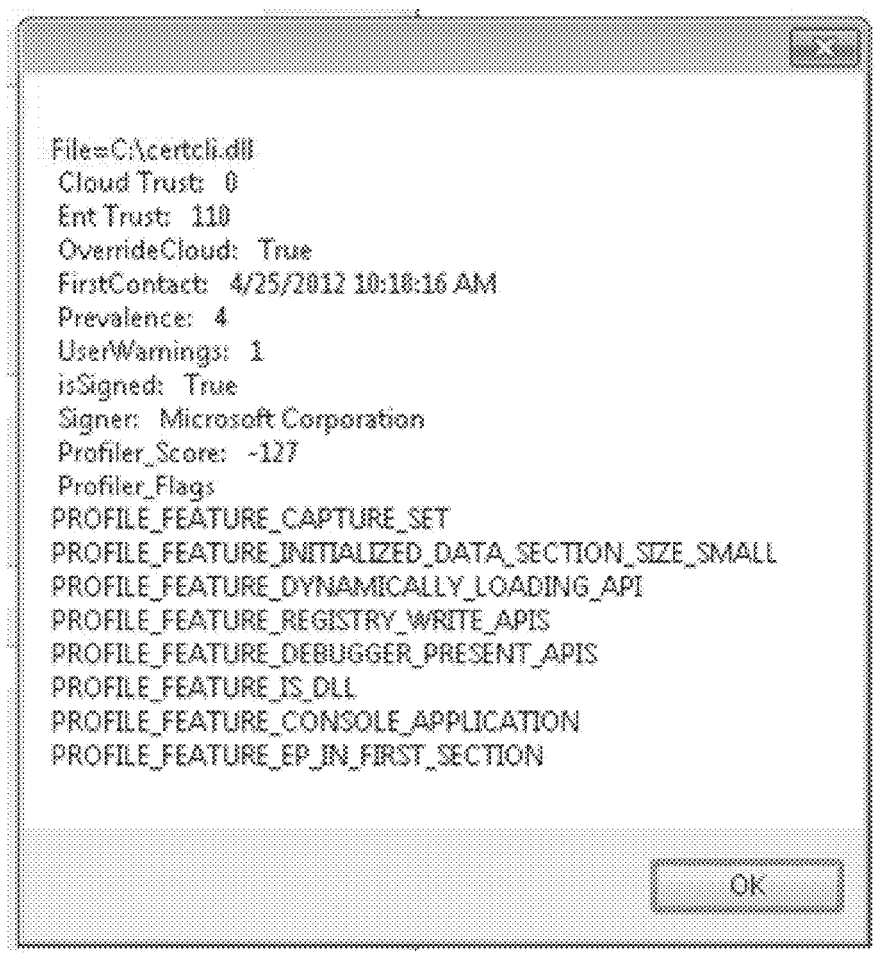
FIG. 5 is a simplified block diagram representing example reputation data in accordance with one embodiment.

Turning to FIG. 5, an example query response 500 of an antimalware support system is represented provided in response to a query of a particular file by an antimalware client local to a host device. As shown in the example of FIG. 5, a variety of information can be communicated in the query response corresponding to all or a portion of the information available at or through the antimalware support system with regard to a particular file. For instance, in this example, reputation data included in the query response 500 can include identified of the file, a trust or reputation level of a threat intelligence system, a trust or reputation level of an enterprise or domain (such as a reputation level or score computed by the antimalware support system), a value for whether domain reputation level or scores should override, preempt, or be preferred over the threat intelligence score (e.g., because different domain-specific (or -preferred) rules or reputation data are used in calculating the domain score, etc.), and so on. For example, additional reputation data can include a first contact date for the file, prevalence of the file in the domain (e.g., the number of different host devices in the domain that have identified the file), and whether a user warning or other user-provided negative feedback has been captured for the file. Certificate or signature information can also be identified in reputation data including whether the file is signed and by whom (e.g., the publisher). File behavior data can also be provided, such as a behavior-based score, flags identifying the respective behaviors detected for the file or other communication of the file's behaviors, among other examples.

Turning to FIG. 6, a flowchart 600 is presented illustrating example operations and actions of an example thin antimalware client of a host device operating cooperatively with an antimalware support system. In one example, an input/output (I/O) event can take place 602 on the host device and involve an executable (or, in some cases, one of a limited subset of non-executable) file. The antimalware client can determine whether cache data exists that identifies that a decision (e.g., whether to approve or deny loading or launching of the file on the host device) had already previously been made (e.g., from the host device's (or another similar host device's) previous encounter with the file, among other potential sources). If a previous decision is cached, this can result in the same decision being applied to the file in connection with the I/O event (e.g., if it is determined that there have been no changes to the file, rules, etc. since the previous decision). If no decision has been cached by the antimalware client, the antimalware client can seek to identify whether cached metadata exists for the file in the local cache of the antimalware client. Such metadata can include reputation data such as certificate date, behavior data, reputation score data, among other example data that the antimalware client is configured to identify and use. If cached data is available for the file (e.g., as collected by the antimalware client or received previously from the antimalware support system or another source, etc.) a domain rule engine 615 of the antimalware client (e.g., applying rules of the domain in which the host device presently resides (as it can potentially reside in multiple independent domains with different rules, etc.)) can utilize the cached metadata to make a decision with regard to the file and further cache 620 this data in the local cache of the antimalware client. In some instances, if the domain rule engine determines (e.g., at 615) determines that the file is dirty or likely untrustworthy (e.g., actual malware), the antimalware client, in some implementations, can include functionality for attempting to convict, clean, or perform another action (e.g., at 625) to remediate the disallowed file.

In instances where no metadata is available within the local cache for the file, the type of I/O event can be identified, such as whether it involves a read and/or write operation 630 and applying a delayed/asynchronous scan queue 640 for write operations. In some instances, a file access can be initially or preliminarily be allowed at a client but may be deemed a file "of interest" at block 640 and may be queued or otherwise delayed to be scanned at a slightly later moment. For read operations, a determination (e.g., at 635) can be made whether the file is a portable executable or other format that can be potentially be launched to create a new process or loaded to extend an existing process, etc. For portable executable (PE) files, the files can proceed to block 655, for other files (e.g., at block 645) the file can be delivered to another process or scan engine (e.g., 650) for assessment.

In some instances, a certificate or signature check (e.g., at 655) can be performed by the antimalware client to determine whether the file is signed and whether the certificate corresponds to one of a set of pre-identified trusted publishers (e.g., as documented, for instance, in a certificate store 665 of trusted certificates identified for the antimalware client, among other examples). In instances where the file is signed by a trusted publisher and the signature is validated (e.g., 670) to authenticate that the trusted publisher is in fact the sender of the trusted certificate, in some implementations, this can lead to a positive decision for the file (e.g., allowing it to be loaded on the host device). However, if the signature validation (e.g., 670) reveals an attempt to spoof the trusted publisher this can, in some implementations, result in the file being convicted 625 as untrustworthy.

In addition to a signature check 655 (and in some cases depending on the result of the signature check), other checks can be run, such as a check of behaviors of the file identifiable from the metadata for the file. In some cases, identification of certain behaviors can result in the file being automatically approved or convicted, while in other instances, certain behaviors (particularly in combination with other information discovered for the file from the metadata, in some implementations) can be used to trigger a query for additional information (e.g., reputation data) or a reputation assessment by the antimalware support system. Such queries can include synchronous queries (e.g., 680) that involve identified high risk behaviors or, in other instances, asynchronous queries (e.g., 685) when lower risk behaviors are identified, among other examples. The results of the query (e.g., 680, 685) can be further used as the basis (potentially in combination with other check results) of an approval or conviction by the rule engine 615, among other examples. In any event, the results obtained from the rule engine, as well as any query results, can be used to update (e.g., at 620) the local cache of the antimalware thin client on the host device.

Figure 7A:
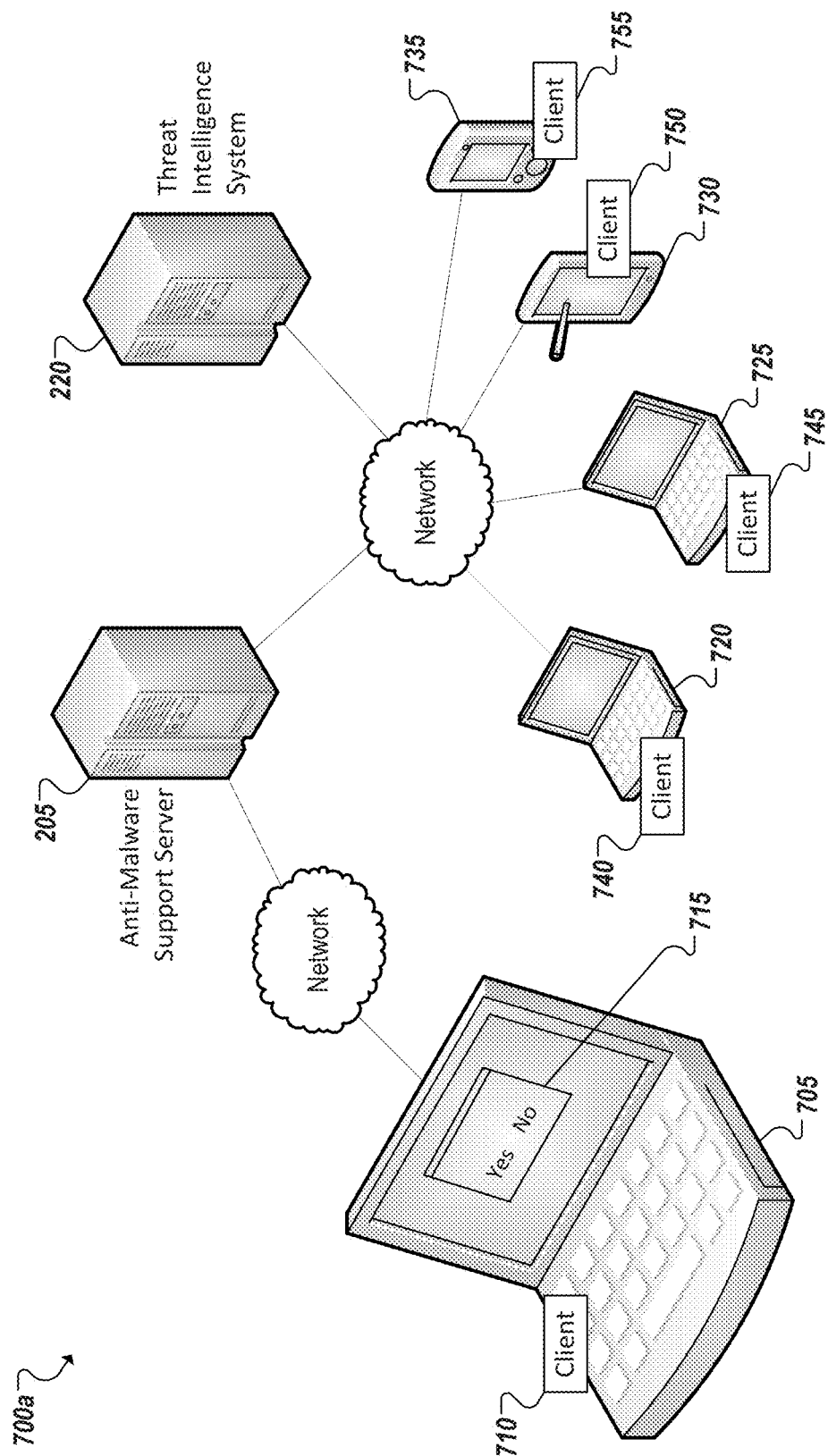
FIGS. 7A-7B are simplified block diagrams representing interactions between host devices and an example antimalware support system in accordance with at least some embodiments.
Figure 7B:
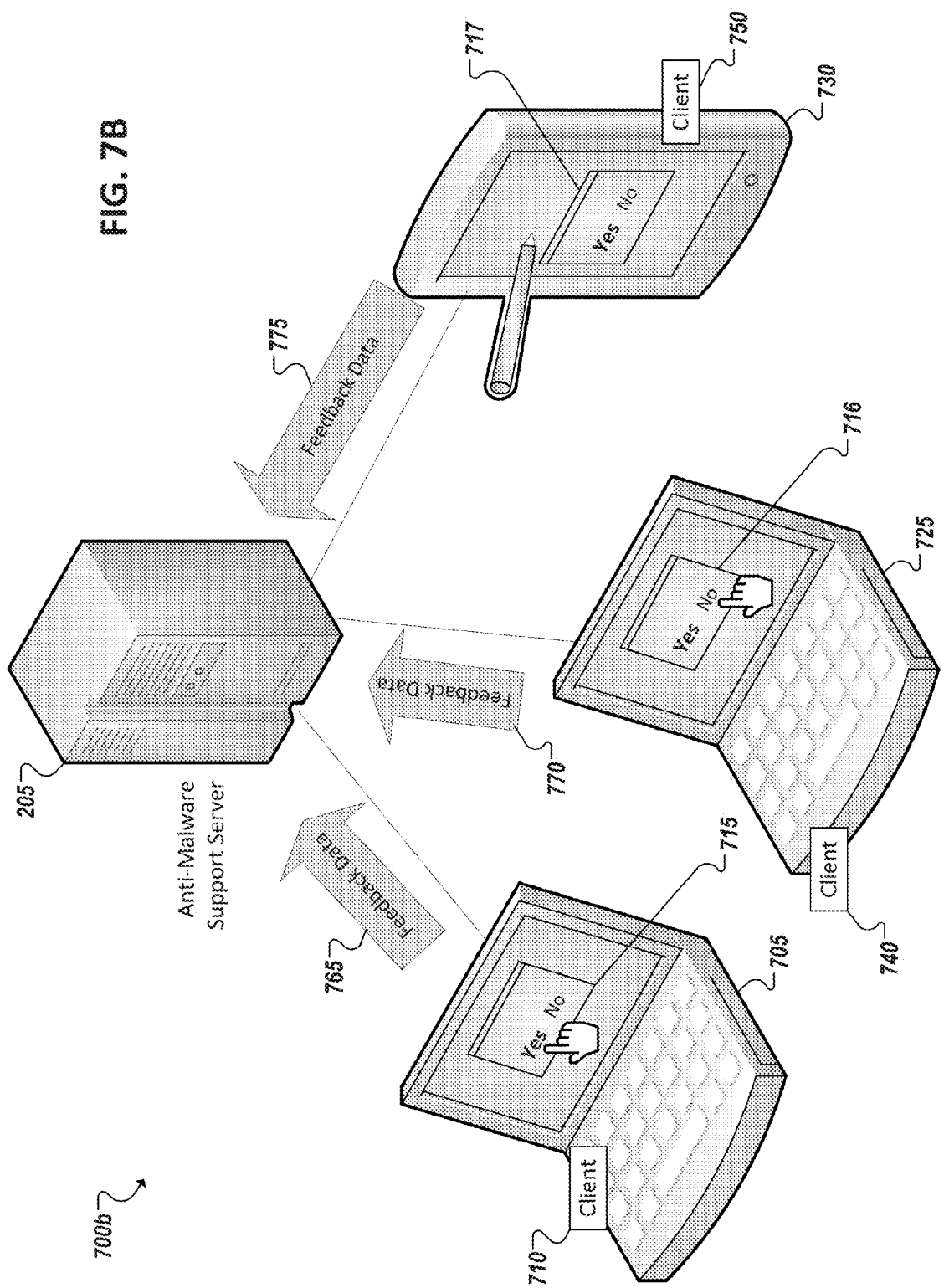

Turning now to the examples of FIGS. 7A-7B, simplified block diagrams 700a-b are shown illustrating certain techniques of a thin antimalware client leveraging information obtained from an antimalware support server 710 to direct, educate, or otherwise assist users of the host device in relation to various events on the host device (such as I/O events involving a file identified in record data or cache of the antimalware client, antimalware support system, etc.). In FIG. 7A, an environment is shown including a host device 705 having an antimalware client 708 configured to provide antimalware services for the host device 705 through collaboration with an example antimalware support system 205. Antimalware support system 205 can provide antimalware support to many other host devices (e.g., 720, 725, 730, 735) within a given domain in connection with the respective antimalware clients (e.g., 740, 745, 750, 755) local to the host devices (e.g., 720, 725, 730, 735). Additionally, through the antimalware support system's interoperation with the various host devices (and other tools, including security tools) within the domain, the antimalware support system 205 can obtain, corroborate, aggregate, and supplement information for files detected, predicted to soon be detected or otherwise potentially detected within the domain from the multiple domain sources (e.g., 710, 740, 745, 750, 755) communicating with it. For instance, antimalware clients (e.g., 710, 740, 745, 750, 755) can query antimalware support system 205 for more information concerning a file while reporting information discovered by the antimalware client relating to the file. Further, antimalware support system 205 can interface with external sources of security intelligences, such as one or more threat intelligence feeds, services, and corresponding systems (e.g., 220) to obtain still further information regarding files which have been or potentially will be encountered by host devices (e.g., 705, 720, 725, 730, 735) within the domain.

In one example, an antimalware client 710 of a host device 705 can further include functionality to utilize local cache data assembled in cooperation with antimalware support system 205 or to obtain other reputation data from the antimalware support system 205 (or even third-party threat intelligence systems (e.g., 220), etc.) in connection with warnings and permission prompts presented to users of the host device 705. For instance, a permission prompt 715 can be presented to a user of the host device 705 on a display device of the host device 705. The permission prompt 715 can give the user the option of approving or denying a particular operation on the host device 705, including operations that relate to one or more files. Antimalware client 710 can identify the respective file and attempt to obtain information from local cache or a query of antimalware support system 205 to provide the user with more information to better inform the user of the decision presented in the permission prompt 715. For instance, such additional information can be provided directly in the prompt 715 or by clicking on a link or other control presented in the prompt, among other examples. The additional presented information can include or otherwise be based on reputation data determined for the file by the antimalware client 705 and/or antimalware support system 205, such as identifying that the file is (or is not) signed by a publisher trusted by the domain, that the file possesses certain behaviors (as well as, in some instances, identifying whether such behaviors are regarding negatively or positively by the domain), one or more reputation scores computed for the file, among other examples.

Indeed, turning to the examples of FIG. 7B, antimalware clients (e.g., 710, 740, 750) can be adapted to not only assist users with deciding how to handle certain permission events (including generating such permission events and presentation of corresponding permission prompts (e.g., 715, 716, 717)) at the respective host device (e.g., 705, 725, 730), but antimalware clients (e.g., 710, 740, 750) can, in some instances, also capture the response of the user (e.g., through the GUI logic results) to the permission prompt (e.g., 715, 716, 717) and report this information to the antimalware support system 205 as further feedback data (e.g., 765, 770, 775) that can be associated with any related files and file reputation records managed by the antimalware support system 205. Such feedback data 765, 770, 775 can, in some instances, be interpreted as a user warning, user approval, or other feedback concerning the trustworthiness of the file, among other examples. Additionally, such user-based feedback data 765, 770, 775 can be considered among other reputation data associated with a given file (both locally at the antimalware client (e.g., 710, 740, 750) or by the antimalware support system 205 in subsequent reputation assessments of the corresponding file, among other examples. Consequently, reputation information presented in connection with a permission prompt for a similar (or repeat) event at the host device (e.g., 705) can additionally include presentation of information captured by the antimalware support system 205 (e.g., through feedback data 765, 770, 775) indicating to the user how other users within the domain have responded to the same, or similar, permission prompt, among other examples.

Figures 8A, 8B:
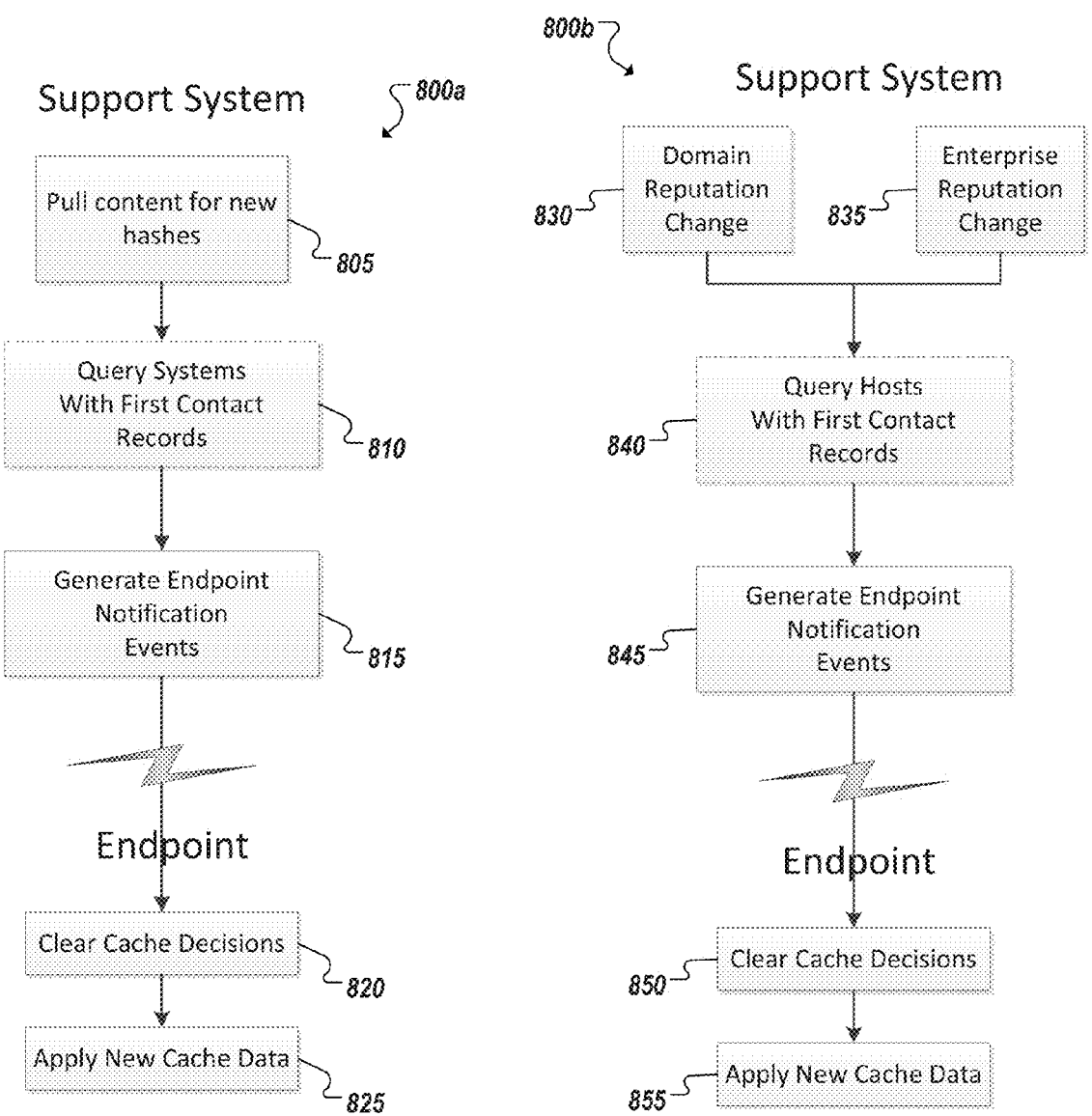
FIGS. 8A-8B are flowcharts representing example operations of an example antimalware support system in accordance with at least some embodiments.

Turning to FIGS. 8A-8B, flowcharts 800a-b are shown illustrating example techniques relating to the updating of local cache data (such as cached metadata for files monitored by local antimalware clients) on host devices (or "endpoints" in these examples) within a domain serviced by an example antimalware support system. In the example of FIG. 8A, an antimalware support system can identify or obtain (e.g., at 805) new content for files (identified through hashes of the files), including reputation data for the files for use by the antimalware support system and antimalware clients on one or more host devices in the domain. For example, the new content and reputation data can be pulled from a threat intelligence feed provided by a third-party threat intelligence service, among other potential examples. New content can also be obtained in connection with queries of the file by one or more of the antimalware clients of host devices within the system, among other examples. In some instances, where available, original sources of the new content can be queried (e.g., 810) for first contact records describing the domain's first contact with the file, among other examples. Further, host device notification events can be generated 815. This can involve identifying which of the domain's host devices the file and new content would be applicable or relevant to. In some examples, this can include determining whether the file has been previously identified by the host device, whether the host device is of a type consistent with other host device's commonly encountering this file, whether host device includes an application, accesses a network, has an associated web access history, or other behavioral characteristics suggesting future or actual relevance to the file, among other example.

Upon identifying the subset of host devices to which the notification events could apply, the antimalware support system can send notification or update data to the corresponding host devices over a network and the host devices can update their respective local cache data (and reputation data) in accordance with the notification. In some instances, receipt of the update or notification in connection with one or more files can cause the host device to clear 820 decision data corresponding to the file. The decision data can be cleared 820 so as to assure that the next time the file is encountered by the host device, that a subsequent decision (e.g., by a local antimalware client) as to how to handle the file, will not be based on stale decision precedents, causing the antimalware client, in some instances, to perform additional checks and assessments (in some cases with the assistance of the antimalware support system) to make a new decision for the file based on the updated information. Additionally, to the extent the notification includes new data, the local cache data of the host device can be updated 825.

Turning to the example of FIG. 8B, not only can a change to a file's reputation data cause an update at the local cache of one or more domain host devices, but reputation changes (as well as rule changes, and other changes detected by the antimalware support system and potentially invalidating the reliability of previous decision and local cache data of host devices) can trigger notification events. For instance, information can be collected regarding the source of a particular file, including the domain or URL associated with the source, an enterprise identified as or associated with the source, etc., and reputation information can be aggregated or managed for each domain, enterprise, etc. As changes to a reputation (such as an update to a reputation level or score for the file) or underlying reputation information for the file changes, based, for instance, on new rules applicable to the domain or changes to the file, etc., notification events 845 can be triggered to notify select host devices of the changed reputation score, reputation information, etc. As in the example of FIG. 8B, such notification or update events can be sent to associated host devices which the host devices can use to clear earlier cache decisions 850 (when such decisions exist locally for the file), reassess a previous reputation or decision for the file, as well as update the local cache itself, among other examples.

The examples of FIGS. 9A-9D illustrated in connection with simplified block diagrams 900a-d, further describe how updates to domain-wide information for files can be used to update file reputation data (e.g., 955, 960) of local caches (e.g., 945, 950) of host devices (e.g., 915, 920) within a domain that includes an antimalware support system 205 interoperating with antimalware clients (e.g., 915, 920, 940) local to the host devices (e.g., 915, 920, 935) within the domain. For instance, in the examples of FIG. 9A, an antimalware support system 205 can receive data 965 from an example threat intelligence system 220 indicating a change to reputation data maintained across the domain for one or more files by antimalware support system 205. Such data 965 can include, for example, reputation data and other content describing file previously unknown to the domain (and antimalware support system 205), data supplementing reputation data for already identified files, and/or data indicating changes to values of existing reputation data (e.g., indicating a change to the file detected by another domain), among other examples. The antimalware support system 205, in some instances, can filter and apply domain-specific overrides, exclusions, filters, and other preferences to the data 965 received from the threat intelligence system 220 to identify new or modified content that can be reported as notifications to one or more host devices within the domain.

Figure 9A:
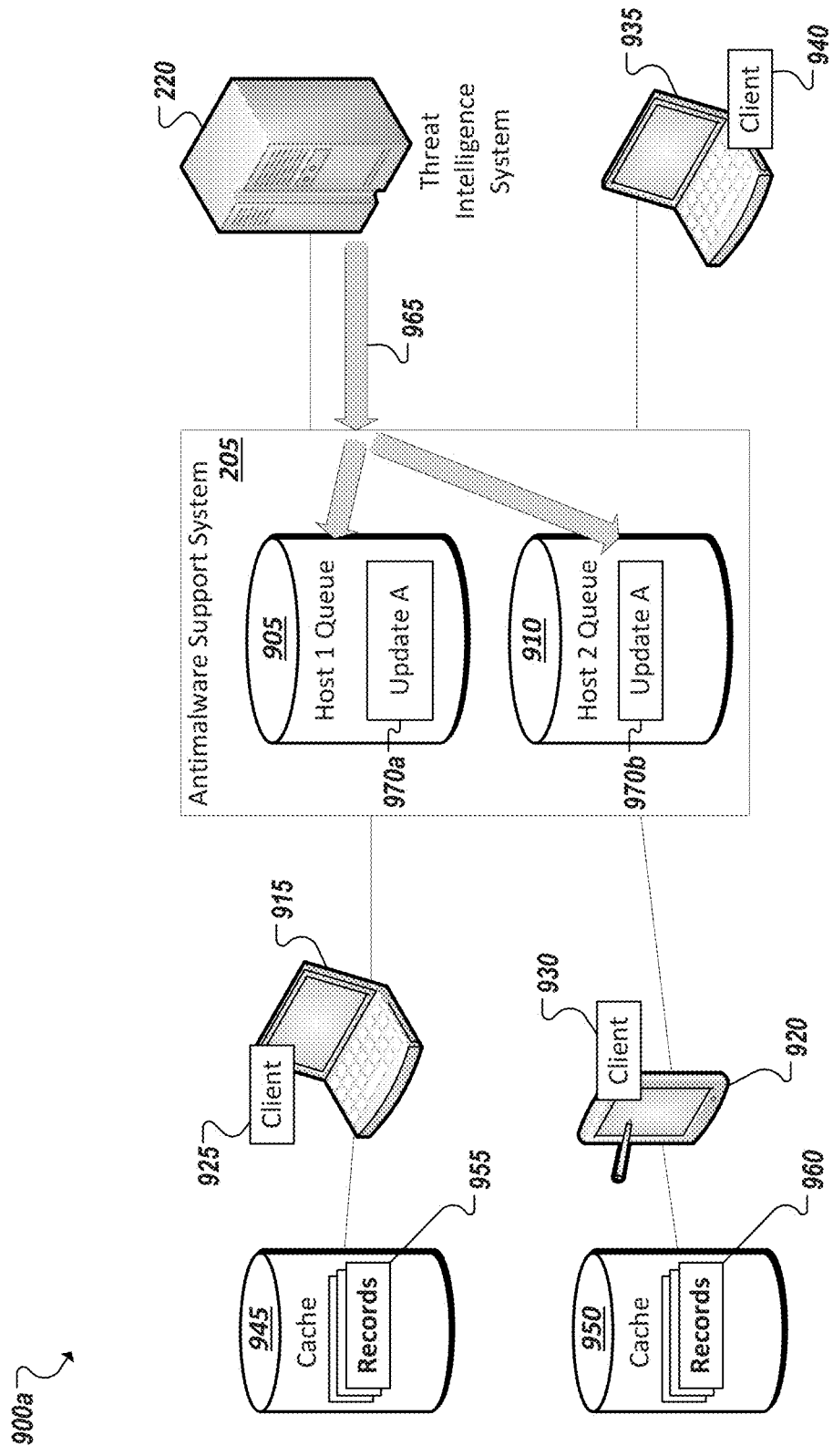
FIGS. 9A-9D are simplified block diagrams representing interactions between host devices and an example antimalware support system in accordance with at least some embodiments.
Figure 9B:
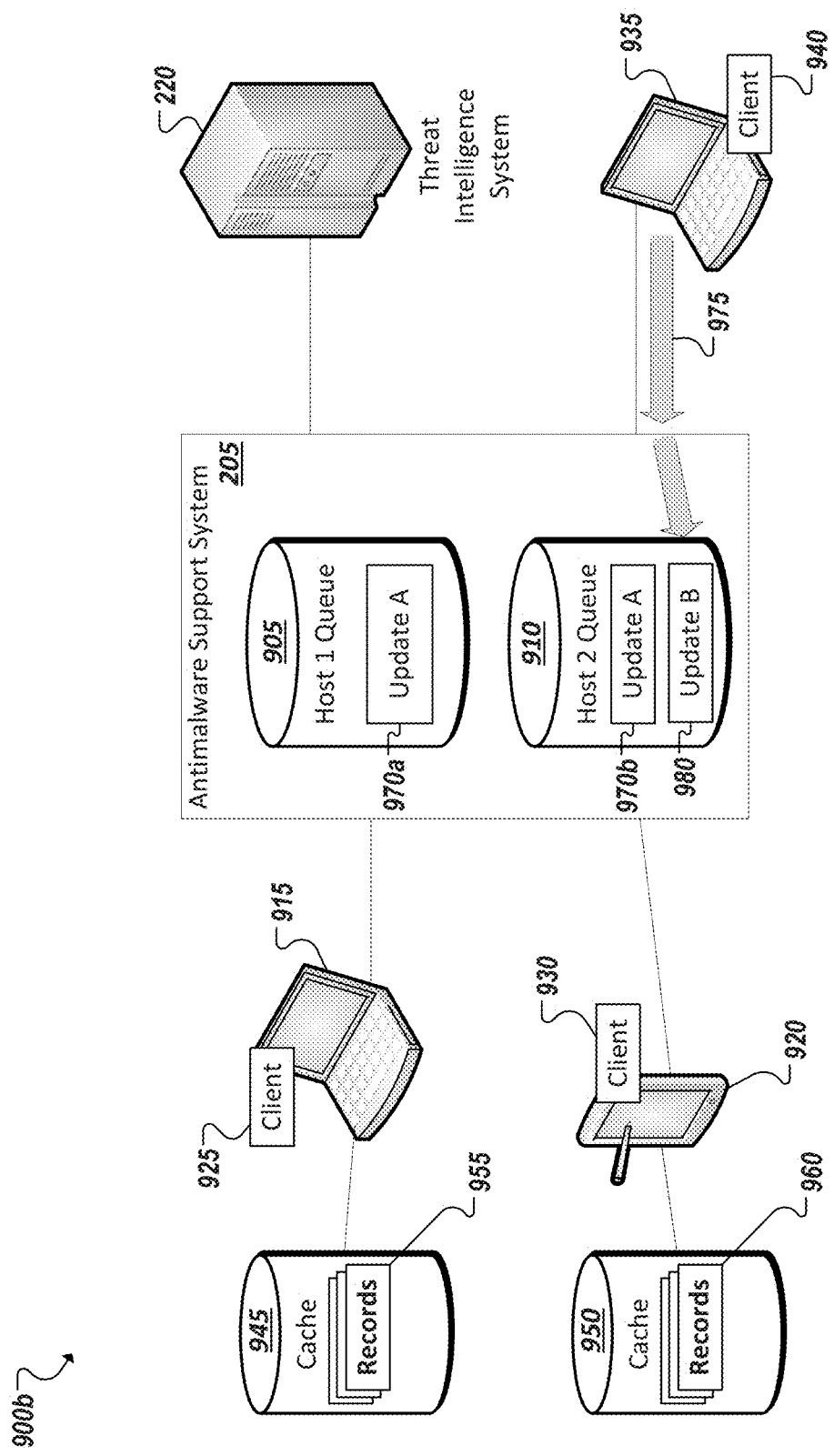

In the particular example of FIG. 9A, antimalware support system 205 can maintain queues (e.g., 905, 910) of updates relevant to the host devices (e.g., 915, 920) of the domain. Such queues (e.g., 905, 910) can be maintained for each host device in the domain. Further, the antimalware support system 205, in some implementations, can filter which updates apply to which host device (e.g., 915, 920), as discussed above. In the example of FIG. 9A, the antimalware support system 205 can determine that a particular update 970, corresponding to received data 965, is applicable to bother host device 915 and host device 920 (as well as potentially other host devices (e.g., 935) in the domain, including those not explicitly shown in FIG. 9A). Accordingly, antimalware support system 205 can add updates 970a-b to the respective queues (e.g., 905, 910) of the host devices 915, 920.

Prior to sending notification of updates 970a-b to host devices 915, 920 additional updates may be identified by the antimalware support system 205 and added to the respective queues 905, 910 of the host devices 915, 920. For instance, in the example of FIG. 9B, reputation data 975 can be received by antimalware support system 205 from another host device 935 in the domain (e.g., in connection with a query of the antimalware support system 205 by the antimalware client 940 of the host device 935). Antimalware support system 205 can identify that this data 975 would update known reputation data for one or more files and further identify that, in this case, a corresponding update (e.g., 980) applies to host device 920 ("Host 2") but not host device 915 ("Host 1"). Accordingly, antimalware support system 205 can add the update 980 to the queue 910 of host device 920.

Figure 9C:
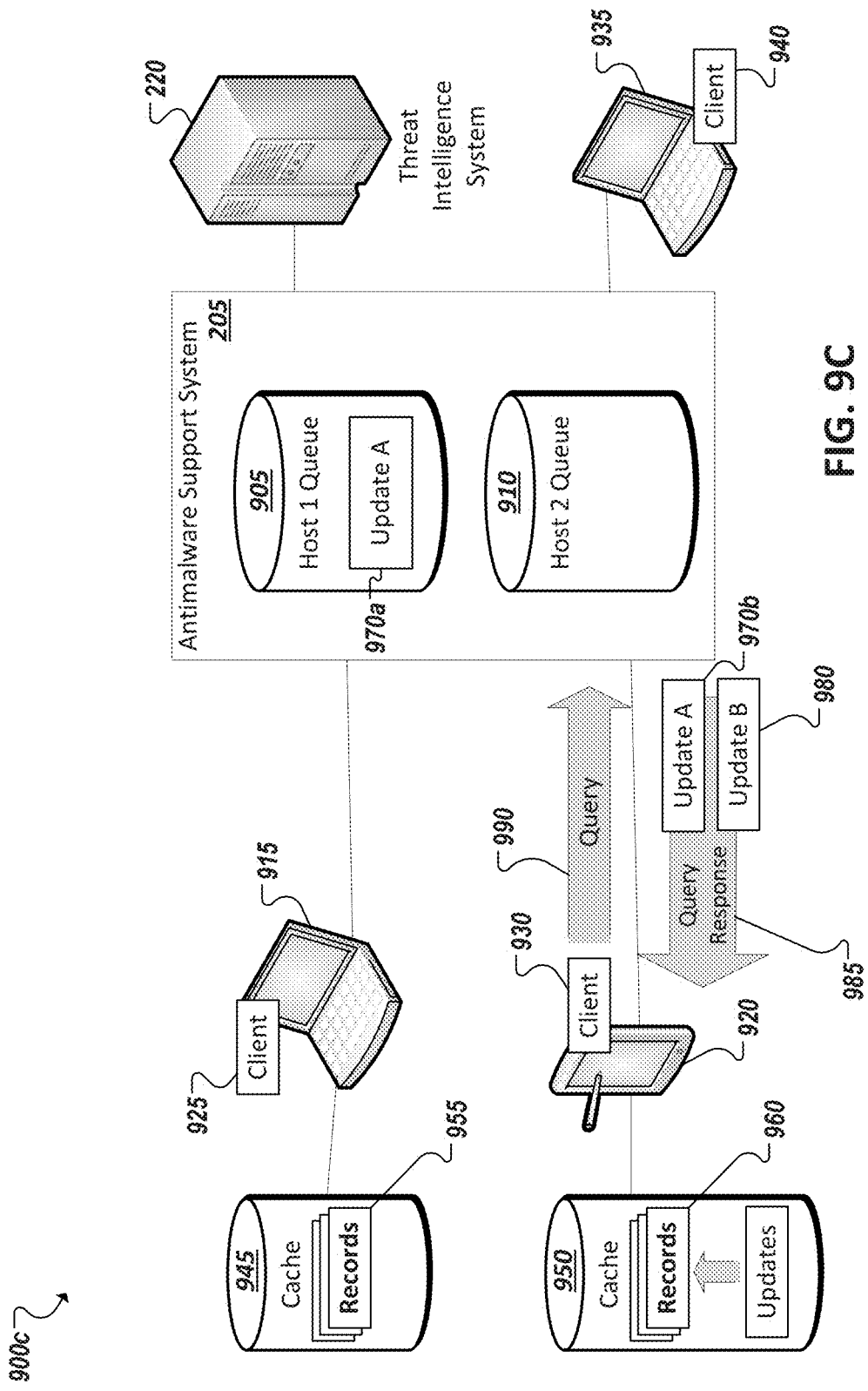
Figure 9D:
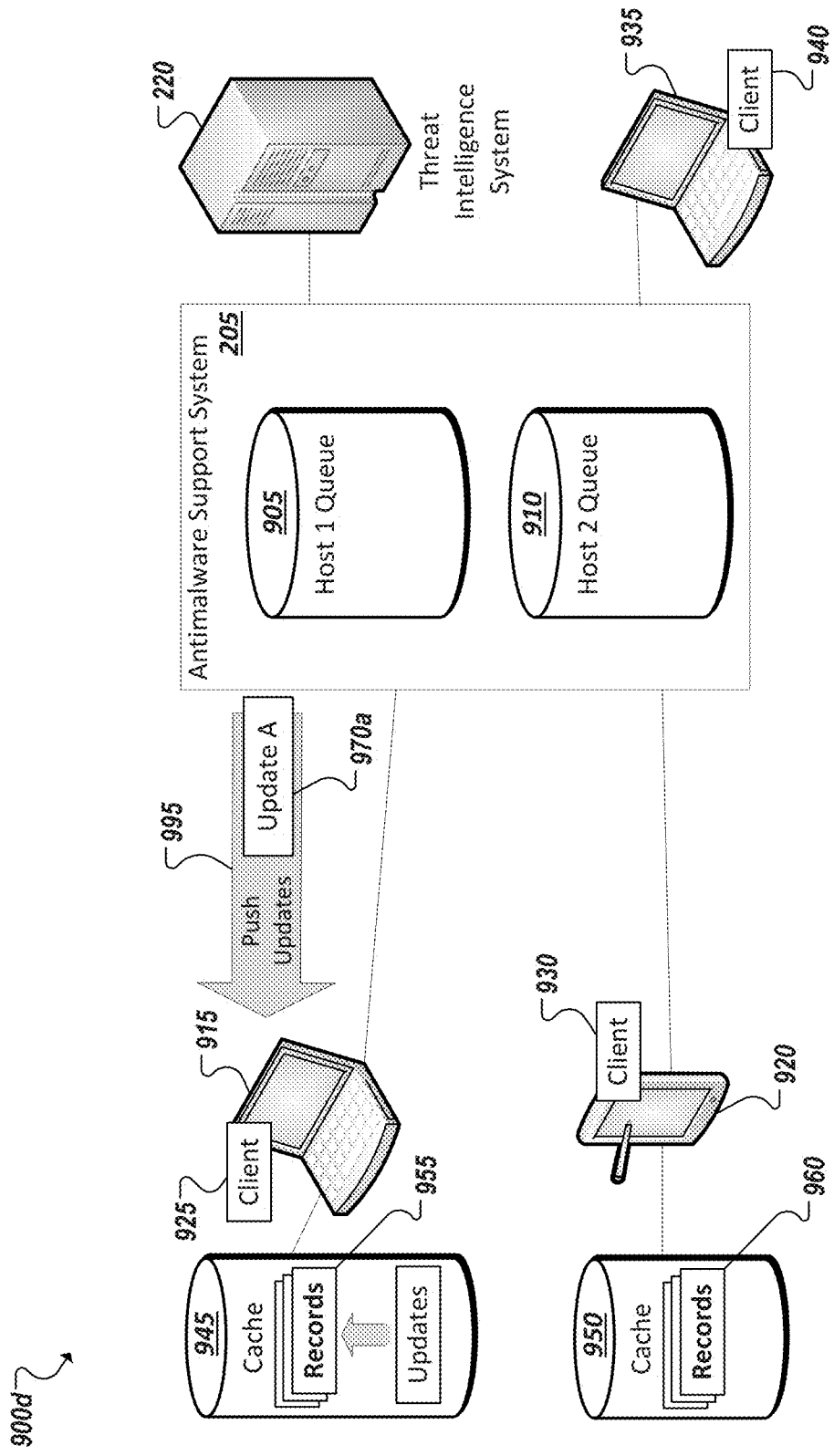

Turning now to FIG. 9C, in order to assist with scaling of an antimalware support system 205 interfacing with potentially thousands of antimalware clients (e.g., 925, 930, 940), among other potential advantages, some implementations of antimalware support system 205, rather than broadcasting updates notifications to host devices (e.g., 915, 920, 935, etc.) can adopt alternative notification techniques in an attempt to better utilize and balance network and system resources utilized in the sending of update notifications. For instance, in one example, antimalware support system 205 can attempt to identify opportunities to leverage other (and in some cases unrelated) communications with a host device (and its antimalware client) to send, or piggyback, update data with other data sent by the antimalware support system 205 to the host device. For example, as shown in FIG. 9C, in some instances, an antimalware client 930 of a host device 920 can query 990 antimalware support system 205 for reputation data in connection with a file (including a file unrelated to updates 970b, 980). The antimalware support system 205 can identify the query 990 as an opportunity to send accumulated update data (e.g., 970b, 980) queued for the host device 920 and cause the update data 970b, 980 to be appended or otherwise communicated in connection with the query response 985 generated by the antimalware support system 205 in response to the query 990. The antimalware client 930 can identify this update information (e.g., 970b, 980) and update its reputation data records 960 in its local cache 950 to incorporate these updates (e.g., 970b, 980).

In some instances, updates can be critical enough to push to a host device. In other instances, while awaiting opportunities to piggyback update data on other data in communications between the antimalware support system 205 and a host device (e.g., 915) can be useful to stagger or randomize such updates throughout the domain, in some instances, no such opportunities may be identified (at least within a particular time frame). However, to prevent file reputation data records (e.g., 955) from becoming too stale (and potentially causing an inconveniently large content update for the host device, or other potential hazard), rules and logic can be provided with antimalware support system 205 to cause at least a portion of queued update data to be pushed to a respective host device once an opportunity to send the update data has not been identified within a particular threshold. For example, a particular time threshold can be determined (e.g., a number of days, hours, etc. since the last update) and if an opportunity to piggyback the update data (e.g., 970a) with other communications between the host device 915 and antimalware support system 205 has not been identified within this time threshold, the update data 970a can be pushed to the antimalware client 925 of host device 915 to update the file reputation records 955 of the local cache 945, as illustrated in the example of FIG.

9D). In another example, a maximum or threshold queue size can be defined and when a particular host device's update queue (e.g., 905) includes a number or amount of updates in excess of this threshold, pushing of at least a portion of the update data (e.g., 970a) can be triggered and initiated by the antimalware support system 205, among other potential examples.

Turning now to FIGS. 10A-10B, simplified block diagrams 1000a-b are shown representing updates to a particular local cache maintained and utilized by an example antimalware client on a host device. For instance, in FIG. 10A, a portion of a local cache 1005a of a host device is represented including a set of file records, each file record corresponding to a respective file and including reputation data for the file for use by an antimalware client of the host device. Such reputation data can include such examples as certificates of the file, an identified source of the file (e.g., an IP address, URL, etc. associated with the encountering of the file), behaviors identified for the file, reputation scores for the file, previous decisions made for the file at the host device (or other host devices) among other examples. In some instances, new content (e.g., 1010) corresponding to a file previously unidentified in a host device's local cache 1005a can be identified and provided to the host device by a remote antimalware support system operating in connection with the host device's antimalware client. In traditional systems, the entire cache of an antimalware tool may have been update by replacing the entirety of the cache, the new version of the cache then reflecting the addition of any new content or changes to existing content. In the example of FIG. 10A, rather than replacing the cache, a new reputation data record specific to the newly-identified file can be generated and added to the local cache (to form cache 1005b). Other records can persist through the update, remaining unaffected by the addition of the new record 1010.

Turning to FIG. 10B, updates to existing reputation data records can also take place on a targeted basis, generating an updated version of those records, rather than replacing the entirety of the cache. For instance, updates can be received from an antimalware support system for File Record 3 (1015a) and File Record 5 (1020a) of a local cache used by a local antimalware client. File Record 3 (1015a) and File Record 5 (1020a) can be modified or replaced, resulting in update file records 1015b and 1020b within the local cache 1005c. Again, updating File Record 3 (1015a) and File Record 5 (1020a) can take place without affecting or in any way modifying or replacing other records not affected by (and persisting throughout) the updating of File Record 3 (1015a) and File Record 5 (1020a), among other examples.

As shown in the representation of FIG. 11, an update to a local cache can involve modifying or updating specific reputation data values of an example record rather than wholly replacing it or other records in a local cache as is customary for malware definition files of traditional antimalware systems. For instance, in the particular example of FIG. 11, an example set of reputation data records 1100 for Files A-D are represented as maintained in local cache of a particular antimalware client. As shown, reputation data values can be maintained for each file such as certificate data (e.g., whether the file is signed, the identification, link to, and/or copy of the certificate, etc.), a SHA hash of the file (e.g., for use in accurately and reliably identifying the file to the antimalware support system), source information corresponding to the file, behavior data for the file (e.g., as expressed in behavior bitmasks, such as described hereafter in examples of FIGS. 12A-12B), prevalence data, global reputation score, domain reputation score, decision result data, user warnings, and so on.

In the example of FIG. 11, update data received from an antimalware support system can be compared against file reputation data records maintained in a local cache used by an antimalware client to identify how the update affects the current cache. Some value can be cleared (such as decision result data, among other examples), while other specific values can be updated in accordance with the received update data. For example, a new prevalence value 1105 can be identified in update data for a File D, resulting in the prevalence reputation data value maintained in the cache for File D being updated to reflect the update value 1105. Similarly, a new domain reputation score 1110 may have been identified from the received update data for File C, causing the previous value to be replaced. In addition to modifying local cache values in response to update notifications from an antimalware support system, the antimalware client can additionally update at least some values of the cache as well as it successfully discovers and determines behaviors and other traits, calculates reputation levels, determines a decision on how to handle the file, among other examples.

Figure 12A:
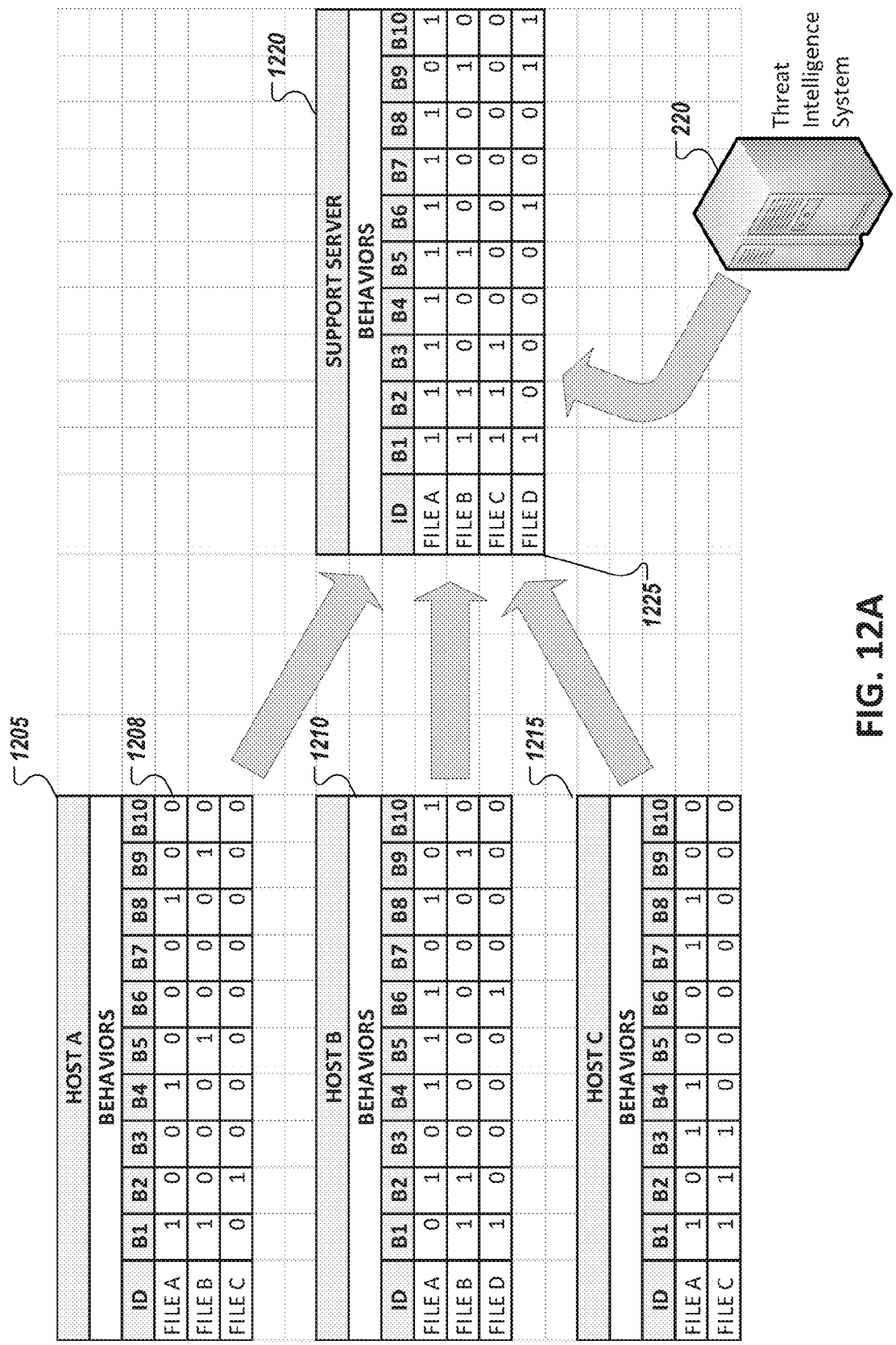
FIGS. 12A-12B are simplified block diagram representing use of file behavior data in accordance with at least some embodiments.
Figure 12B:
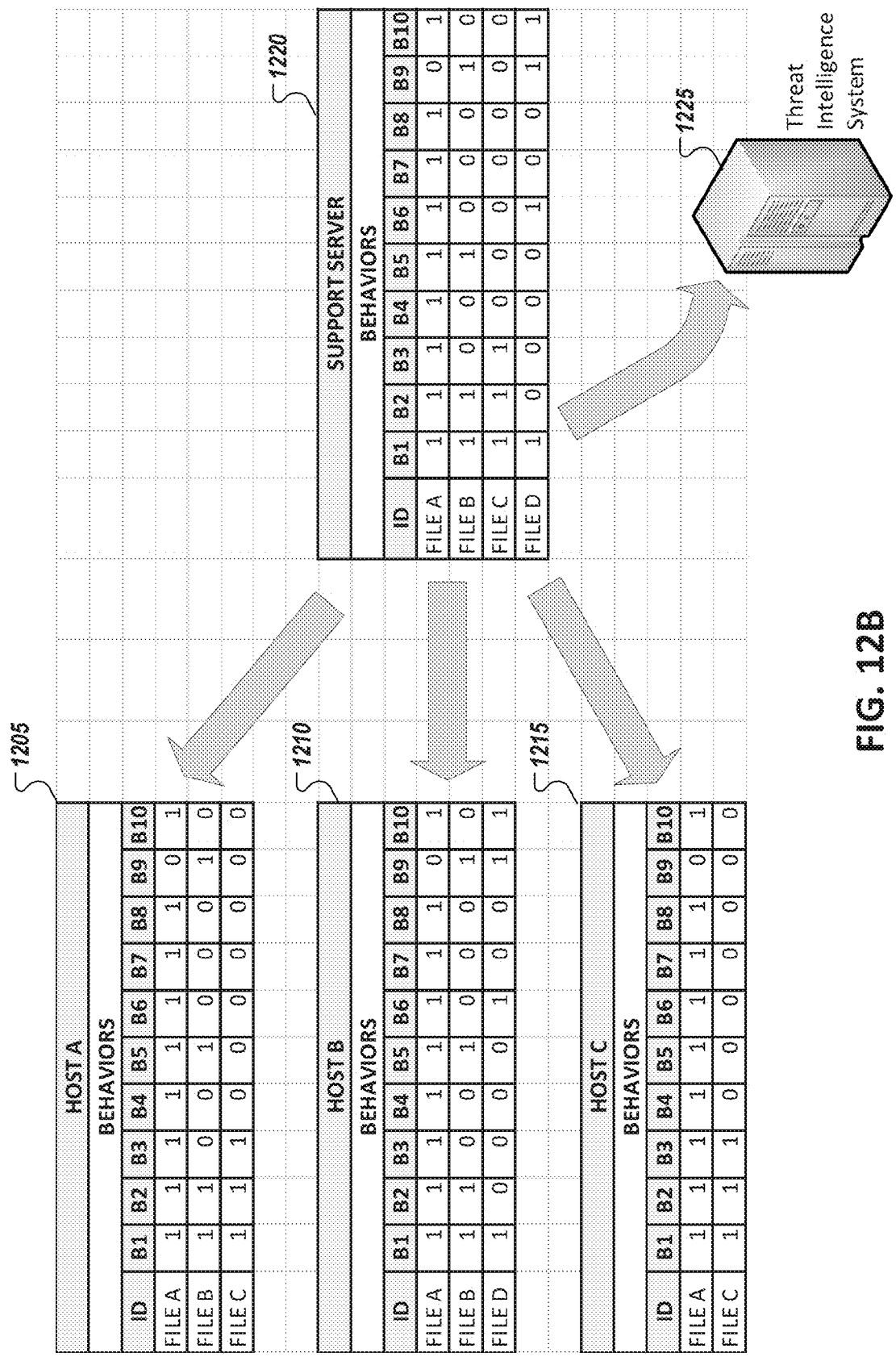

Turning to the examples of FIGS. 12A-12B, in some implementations, antimalware clients local to host devices within a domain can be equipped with functionality for identifying (in some cases with assistance of other hardware- and software-based functionality on the host device) certain behaviors of files encountered by the host device. Such behaviors can include, as examples, whether the file attempts to access a network or external system, whether the file can or has written an autorun registry key, has registered as a service, accesses another process, modifies or attempts to modify critical system files, among other examples. In some instances, the antimalware client can be thin client only equipped with functionality for potentially discovering one of a predefined set of common file behaviors, among other examples. In one example, a bitmask can be defined with each bit in the mask corresponding to whether a respective behavior has been identified for a file. For example, in FIG. 12A, a set of behavior bitmasks is represented as being maintained respectively at a set of host devices within a given domain for each file in local cache of the respective device.

For instance, a Host A can have a local cache with reputation data records in local cache for Files A, B, and C. The local cache records can link to, include, or otherwise reference a behavior bitmask for each of Files A, B, and C, as represented at 1205. For instance, a bitmask 1208 can correspond to the behaviors identified for File A using the antimalware client of Host A (or as communicated to Host A at initiation by an antimalware support system, among other examples. The bitmask 1208 can identify that behaviors B1, B4, and B8 have been identified for File A. Some of these behaviors or particular known combinations of these behaviors may be associated with malware as defined by one or more domain-specific rules in some examples. Similar bitmasks can be maintained for Files B and C at Host A.

Behavior bitmasks maintained by other host devices in a domain may reveal other or different behaviors of files than determined at Host A. For instance, Host B may also include local cache records for File A, but an antimalware client of Host B may possess functionality (or may leverage the particular functionality of Host B) to discover behaviors of File A not discovered (or discoverable) through the antimalware client of Host A (and vice versa). Additionally, some host devices may be used and encounter files in different contexts resulting in different respective sets of behaviors and characteristics of the same file being discovered at each different host device, among other examples. For example, in the example of FIG. 12A, it may have been identified at Host B that File A additionally possesses behaviors B2, B5, B6, and B10 (while the assessment at Host B missed behavior B1).

An antimalware support system can leverage the varying types and functionality of host devices and antimalware clients on host devices within its domain in order to accumulate or more comprehensive picture of the files identified within the domain. In the example of FIG. 12A, antimalware support system can receive reputation data including, in some instances, behavior bitmasks (e.g., 1208), behavior flags, or other behavior information for files as detected by various antimalware clients interfacing with the antimalware support system within the domain. Accordingly, the antimalware support system can maintain comprehensive reputation data records for every file detected within a domain (or believed to potentially affect the domain) and further aggregate reputation data for each file. In the example of FIG. 12A, antimalware support system can maintain a set 1220 behavior bitmasks for each file and can set behavior bitmask bits (e.g., through an OR operation) based on the respective behavior bitmasks communicated by antimalware clients detecting behaviors for each respective file. As an example, for File A, antimalware support system can receive bitmasks from each of Hosts A, B, and C to which File A is relevant and identified in each host's respective local cache. Antimalware support system can combine the respective behavior bitmasks identifying behaviors of File A received from each of Hosts A, B, and C to generate or maintain its own behavior bitmask for File A at antimalware support system. In this example, the aggregate behaviors identified by the hosts' antimalware clients include each of behaviors B1-B8 and B10. In this way, an antimalware support system can catalog each of a particular File's behaviors identified by host devices (or other sources).

In addition to updating and developing domain-wide behavior data (e.g., bitmasks) cataloguing identified file behavior for a domain, antimalware support system can additionally consider information received from sources outside of the domain, such as through an example threat intelligence system 220. For instance, in the behavior bitmask 1225 for File D, host devices within the antimalware support system's domain (e.g., Host B) may not have identified each of the behaviors of the file, such as behaviors identified by other sources reporting to threat intelligence system 220. For instance, behaviors B9 and B10 were not reported by Host B as applying to File D, but the behavior bitmask 1225 of the antimalware support system may nonetheless reflect these behaviors based on threat intelligence data for File D received from threat intelligence system 220.

As with other data collected by an antimalware support system, this information can be shared with affected or otherwise relevant host devices in a domain, for instance, through updates issued by the antimalware support system. The same can be true for behavior reputation data of files. As shown in the example of FIG. 12B, the aggregated behavior information for files in a domain identified, for instance, from behavior reputation data (e.g., 1220) of the antimalware support system can be shared (e.g., through update notifications) with relevant host devices to allow the antimalware clients of the host device access to the collective intelligence of the antimalware support system, among other examples and advantages.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

FIGS. 13A-13D are simplified flowcharts 1300a-d illustrating example techniques involving, for instance, an antimalware client of a host device configured to operate in connection with an antimalware support system of a domain. For example, in FIG. 13A, a file can be identified 1302 at a host device and a determination can be made 1304, for instance, using a local antimalware client on the host device, whether local reputation information is available that describes features of the file indicating whether the file is malicious or not. Such features and reputation data embodying the reputation information can include previously received reputation scores for the file, previous actions taken against the file by the host device, certificate information of the file, a publisher of the file, behaviors detected for the file, among other potential features. A query can be sent 1306 to a remote antimalware support system for additional reputation information for the file to assist the host device, for instance, in determining how to handle the file. Supplemental reputation data can be received 1308 from the antimalware support system in response to the query. The host device (e.g., using a local antimalware client) can utilize the received reputation data as well as any other local reputation data to determine 1310 an action to perform on the file. Such an action can include, for example, allowing the file to launch or be loaded on the host device, denying the launch of the file, initiating remediation of the file, among other examples.

Turning to FIG. 13B, in another example, an event can be detected 1312 at a host device. In some instances, the event can involve or implicate a particular file, URL, IP address, or other source or cause. In one example, the event can be an attempt to access or launch a particular file, such as a file received in an email or via an online communication, among other potential examples. Reputation data can be identified 1314 that is associated with the event, such as reputation data associated with an identified file, URL, IP address, or another entity. Reputation data can be provided from or based on information hosted and collected by an antimalware support system providing antimalware support services to a plurality of antimalware tools and corresponding host devices within a domain. The reputation data maintained by an antimalware support system can be based on information obtained from the plurality of antimalware tools, including information obtained through queries submitted to the antimalware support system from the various antimalware clients and tools. Indeed, identifying 1314 reputation data can include the querying of an antimalware support system for reputation data relating to the identified event, file, etc. Reputation data, including reputation data sourced or collected from an antimalware support system can be identified 1314 and a prompt can be presented to a user in connection with the detected event. The prompt can attempt to confirm, from the user, that the event should be allowed to proceed on the host device. To assist the user in assessing whether to grant this confirmation, reputation data identified 1314, at least in part, from an antimalware support system can be caused 1316 to be presented in connection with the prompt. A user can decide to consider or be influenced by the presented reputation information or not. Additionally, however the user decides to respond to the prompt, the user input received in connection with the prompt can be identified 1318 and used, in some implementations, as further reputation data collected and maintained in association with the identified event as well as any files, addresses, etc. associated with the event.

Turning now to FIG. 13C, an update can be received 1320 from an antimalware support system for a particular file. Rather than replacing the entirety of a local cache utilized by a local antimalware client on a host device, only those cache records that correspond to the reputation data may be updated 1322. Indeed, other cache records can be preserved 1324 and persist through the updating of the specific caches records maintained locally at a host device for the particular file. A local antimalware client can utilize cache records, for instance, to identify whether and what type of reputation data is available locally at the host device. Updates to this data can reflect additional intelligence obtained by an antimalware support system for these particular files. A targeted update of a particular cache record can enhance operation of the local antimalware client while making efficient use of bandwidth and other computer processing resources.

Turning now to FIG. 13D, an update can be identified 1330 to reputation information for a file. Such an update can be identified 1330, for instance, at an antimalware support system. The update can be determined 1332 to be applicable to a particular subset of host devices in a domain. Further, an opportunity can be detected that would allow the antimalware support system to append update data to other communications between the antimalware support system and host devices in the particular subset. Such updates can be opportunistic in this regard. Indeed, when such an opportunity is detected 1334, the antimalware support system can determine what if any updates can be sent to the host device in connection with or based on the opportunity, and can send (e.g., 1336) the update to the particular host during the detected opportunity. In some implementations, such update data can piggyback on a response by the antimalware support system to host device in response to a query from the host device. Further, in some implementations, queues of updates can be maintained for each of a plurality of host devices in a domain, with the updates in each queue being opportunistically delivered to their respective host device in connection with identified opportunities to append the update data to other transactions between the host device and the antimalware support system, among other examples.

Figure 15:
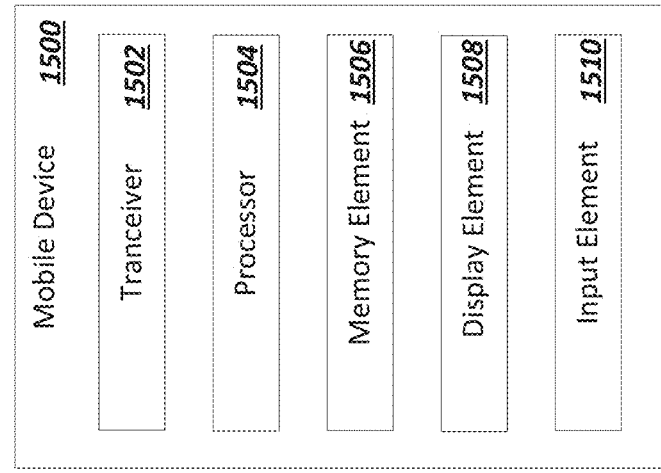
FIG. 15 is a block diagram of an exemplary mobile device system in accordance with one embodiment.
Figure 14:
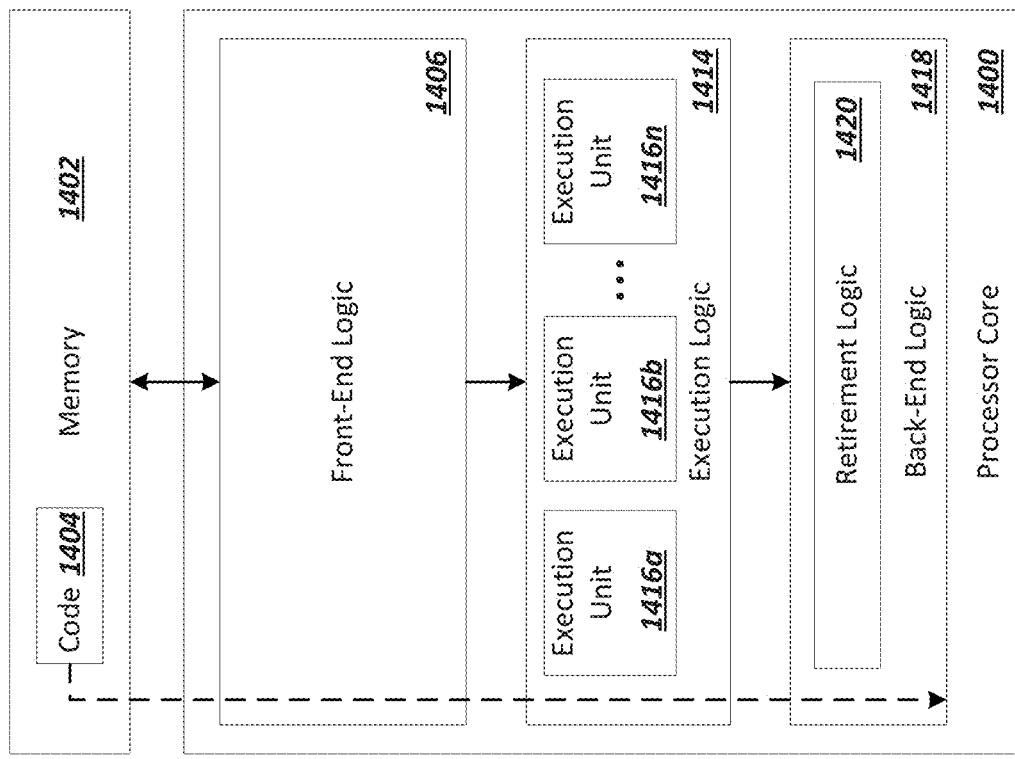
FIG. 14 is a block is a block diagram of an exemplary processor in accordance with one embodiment.
Figure 16:
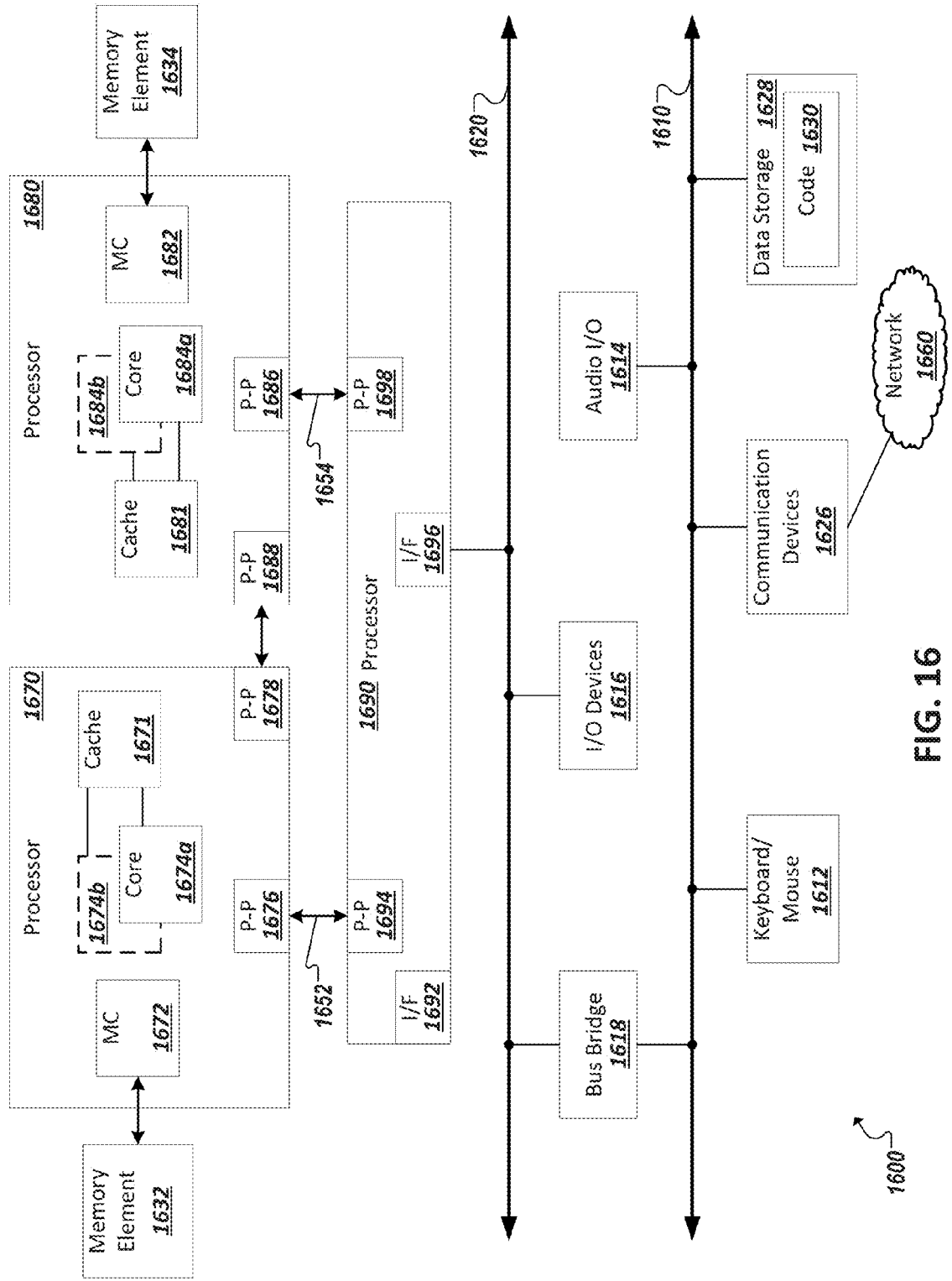
FIG. 16 is a block diagram of an exemplary computing system in accordance with one embodiment Like reference numbers and designations in the various drawings indicate like elements.

FIGS. 14-16 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 14-16.

FIG. 14 is an example illustration of a processor according to an embodiment. Processor 1400 is an example of a type of hardware device that can be used in connection with the implementations above.

Processor 1400 may be any type of processor, such as a microprocessor, an embedded processor, a digital signal processor (DSP), a network processor, a multi-core processor, a single core processor, or other device to execute code. Although only one processor 1400 is illustrated in FIG. 14, a processing element may alternatively include more than one of processor 1400 illustrated in FIG. 14. Processor 1400 may be a single-threaded core or, for at least one embodiment, the processor 1400 may be multi-threaded in that it may include more than one hardware thread context (or "logical processor") per core.

FIG. 14 also illustrates a memory 1402 coupled to processor 1400 in accordance with an embodiment. Memory 1402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1400 can execute any type of instructions associated with algorithms, processes, or operations detailed herein. Generally, processor 1400 can transform an element or an article (e.g., data) from one state or thing to another state or thing.

Code 1404, which may be one or more instructions to be executed by processor 1400, may be stored in memory 1402, or may be stored in software, hardware, firmware, or any suitable combination thereof, or in any other internal or external component, device, element, or object where appropriate and based on particular needs. In one example, processor 1400 can follow a program sequence of instructions indicated by code 1404. Each instruction enters a front-end logic 1406 and is processed by one or more decoders 1408. The decoder may generate, as its output, a micro operation such as a fixed width micro operation in a predefined format, or may generate other instructions, microinstructions, or control signals that reflect the original code instruction. Front-end logic 1406 also includes register renaming logic 1410 and scheduling logic 1412, which generally allocate resources and queue the operation corresponding to the instruction for execution.

Processor 1400 can also include execution logic 1414 having a set of execution units 1416a, 1416b, 1416n, etc. Some embodiments may include a number of execution units dedicated to specific functions or sets of functions. Other embodiments may include only one execution unit or one execution unit that can perform a particular function. Execution logic 1414 performs the operations specified by code instructions.

After completion of execution of the operations specified by the code instructions, back-end logic 1418 can retire the instructions of code 1404. In one embodiment, processor 1400 allows out of order execution but requires in order retirement of instructions. Retirement logic 1420 may take a variety of known forms (e.g., re-order buffers or the like). In this manner, processor 1400 is transformed during execution of code 1404, at least in terms of the output generated by the decoder, hardware registers and tables utilized by register renaming logic 1410, and any registers (not shown) modified by execution logic 1414.

Although not shown in FIG. 14, a processing element may include other elements on a chip with processor 1400. For example, a processing element may include memory control logic along with processor 1400. The processing element may include I/O control logic and/or may include I/O control logic integrated with memory control logic. The processing element may also include one or more caches. In some embodiments, non-volatile memory (such as flash memory or fuses) may also be included on the chip with processor 1400.

Referring now to FIG. 15, a block diagram is illustrated of an example mobile device 1500. Mobile device 1500 is an example of a possible computing system (e.g., a host or endpoint device) of the examples and implementations described herein. In an embodiment, mobile device 1500 operates as a transmitter and a receiver of wireless communications signals. Specifically, in one example, mobile device 1500 may be capable of both transmitting and receiving cellular network voice and data mobile services. Mobile services include such functionality as full Internet access, downloadable and streaming video content, as well as voice telephone communications.

Mobile device 1500 may correspond to a conventional wireless or cellular portable telephone, such as a handset that is capable of receiving "3G", or "third generation" cellular services. In another example, mobile device 1500 may be capable of transmitting and receiving "4G" mobile services as well, or any other mobile service.

Examples of devices that can correspond to mobile device 1500 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 1500 illustrated in FIG. 15 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 1500 includes a transceiver 1502, which is connected to and in communication with an antenna. Transceiver 1502 may be a radio frequency transceiver. Also, wireless signals may be transmitted and received via transceiver 1502. Transceiver 1502 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4 G communications. Transceiver 1502 is connected to a processor 1504, which may perform the bulk of the digital signal processing of signals to be communicated and signals received, at the baseband frequency. Processor 1504 can provide a graphics interface to a display element 1508, for the display of text, graphics, and video to a user, as well as an input element 1510 for accepting inputs from users, such as a touchpad, keypad, roller mouse, and other examples. Processor 1504 may include an embodiment such as shown and described with reference to processor 1400 of FIG. 14.

In an aspect of this disclosure, processor 1504 may be a processor that can execute any type of instructions to achieve the functionality and operations as detailed herein. Processor 1504 may also be coupled to a memory element 1506 for storing information and data used in operations performed using the processor 1504. Additional details of an example processor 1504 and memory element 1506 are subsequently described herein. In an example embodiment, mobile device 1500 may be designed with a system-on-a-chip (SoC) architecture, which integrates many or all components of the mobile device into a single chip, in at least some embodiments.

FIG. 16 illustrates a computing system 1600 that is arranged in a point-to-point (PtP) configuration according to an embodiment. In particular, FIG. 16 shows a system where processors, memory, and input/output devices are interconnected by a number of point-to-point interfaces. Generally, one or more of the computing systems described herein may be configured in the same or similar manner as computing system 1600.

Processors 1670 and 1680 may also each include integrated memory controller logic (MC) 1672 and 1682 to communicate with memory elements 1632 and 1634. In alternative embodiments, memory controller logic 1672 and 1682 may be discrete logic separate from processors 1670 and 1680. Memory elements 1632 and/or 1634 may store various data to be used by processors 1670 and 1680 in achieving operations and functionality outlined herein.

Processors 1670 and 1680 may be any type of processor, such as those discussed in connection with other figures. Processors 1670 and 1680 may exchange data via a point-to-point (PtP) interface 1650 using point-to-point interface circuits 1678 and 1688, respectively. Processors 1670 and 1680 may each exchange data with a chipset 1690 via individual point-to-point interfaces 1652 and 1654 using point-to-point interface circuits 1676, 1686, 1694, and 1698. Chipset 1690 may also exchange data with a high-performance graphics circuit 1638 via a high-performance graphics interface 1639, using an interface circuit 1692, which could be a PtP interface circuit. In alternative embodiments, any or all of the PtP links illustrated in FIG. 16 could be implemented as a multi-drop bus rather than a PtP link.

Chipset 1690 may be in communication with a bus 1620 via an interface circuit 1696. Bus 1620 may have one or more devices that communicate over it, such as a bus bridge 1618 and I/O devices 1616. Via a bus 1610, bus bridge 1618 may be in communication with other devices such as a keyboard/mouse 1612 (or other input devices such as a touch screen, trackball, etc.), communication devices 1626 (such as modems, network interface devices, or other types of communication devices that may communicate through a computer network 1660), audio I/O devices 1614, and/or a data storage device 1628. Data storage device 1628 may store code 1630, which may be executed by processors 1670 and/or 1680. In alternative embodiments, any portions of the bus architectures could be implemented with one or more PtP links.

The computer system depicted in FIG. 16 is a schematic illustration of an embodiment of a computing system that may be utilized to implement various embodiments discussed herein. It will be appreciated that various components of the system depicted in FIG. 16 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

In general, one aspect of the subject matter described in this specification can be embodied in methods and executed instructions that include or cause the actions of identifying a file at a host device, determining whether local reputation data is available at the host device for the file, sending a query to an antimalware support system relating to the file, receiving particular reputation data from the antimalware support system corresponding to the query, and determining whether to allow the file to be loaded on the host device based at least in part on the particular reputation data.

Another general aspect of the subject matter described in this specification can be embodied in systems that include a processor device, memory element, and an antimalware client local to a host device. The antimalware client can be adapted, when executed by the processor device, to identify a file at the host device, scan the file to identify characteristics of the file, maintain local reputation data at the host device to describe characteristics of the file, and send a query including the local reputation data to an antimalware support system relating to the file. The antimalware client can further receive particular reputation data from the antimalware support system corresponding to the query and determine whether to allow the file to be loaded on the host device based at least in part on the particular reputation data.

These and other embodiments can each optionally include one or more of the following features. The file can be an executable or a non-executable file. Local reputation data can be determined to be available for the file at the host device, and it can be determined that the local reputation data is insufficient to determine whether to allow the file to be loaded on the host device. The particular reputation data can include a previously-determined reputation score for the file, in some cases the file can be allowed to load on the host device when the reputation score is above a corresponding threshold score. The local reputation data can includes a certificate of the file and determining whether to allow the file can be further based at least in part on the certificate, and it can be determined whether the certificate is included in a listing of approved certificates for a domain, such as a certificate of one of a set of trusted publishers identified for a domain, among other examples. Determining whether to allow the file to be loaded on the host device can be further based, at least in part, on the local reputation data. The particular reputation data can describe behaviors of the file. Determining whether to allow the file to be loaded on the host device can be based on one or more rules. The one or more rules can be rules of a particular domain of the antimalware support system. The host device can be a particular type and the rules can be specific to devices of the particular type. A copy of the file can be sent with a query to the antimalware support system. A hash of the file can be generated and the file can be identified by the hash. The file can be scanned to identify one or more characteristics to be included in the local reputation data, among other potential features.

In general, one aspect of the subject matter described in this specification can be embodied in methods and executed instructions that include or cause the actions of identifying a detected event at a host device and identifying reputation data corresponding to the event maintained by an antimalware support system remote from the host device, the reputation data based at least in part on data received from a plurality of entities remote from the host device. The reputation data can be caused to be presented with a prompt to a user of the host device requesting permission for the event.

Another general aspect of the subject matter described in this specification can be embodied in systems that include a processor device, memory element, and an antimalware client local to a host device. The antimalware client can be adapted, when executed by the at least one processor device, to identify a detected event at a host device, identify reputation data corresponding to the event maintained by an antimalware support system remote from the host device, and cause the reputation data to be presented with a prompt of a user of the host device to request permission for the event. The reputation data can be based at least in part on data received from a plurality of entities remote from the host device.

These and other embodiments can each optionally include one or more of the following features. Presentation of the reputation data can include a description of characteristics of the file described in the reputation data. Data can be collected describing the response of the user to the prompt, and the data describing the response can be added to the reputation data corresponding to the event. The event can be associated with a file encountered by the host device and the reputation data can describe characteristics of the file. The characteristics of the file can include behaviors of the file. At least a portion of the characteristics can be discovered by an antimalware tool local to the host device, while other portions may additionally, or instead, be discovered by one or more of the plurality of entities. The plurality of entities can include a plurality of other host devices, and antimalware tools local to the plurality of other host devices can report the characteristics of the file to the antimalware support system. The reputation data can include a reputation score for the event. The reputation data can describe a response of at least one other user to another prompt requesting permission of the other user for the event. The other prompt can correspond to an instance of the vent at another host device. The reputation data can describe cumulative responses of a plurality of other users to prompts requesting user permission for the event. The reputation data can be based at least in part on intelligence data received by the antimalware support system from a third party intelligence service.

Additional features can include identifying reputation data to include receiving the reputation data from the antimalware support in response to a request of the antimalware support system. Local reputation data at the host device can be identified and also be presented in the prompt. Further, an antimalware support system can receive the request for reputation data corresponding to an event involving a particular file at the host device, identify particular reputation data for the file based at least in part on data received from a plurality of entities remote from the host device, and return the particular reputation data in a response to the host device for use by the host device in providing the prompt. The request can include a hash of the file and other reputation data for the file detected at the host device. The reputation data can include or otherwise be based on data received from a third party intelligence service. Reputation data returned by the antimalware support system can include a reputation for the file generated from reputation information available for the file, and the reputation score can be included in the response.

In general, one aspect of the subject matter described in this specification can be embodied in methods and executed instructions that include or cause the actions of receiving an update for at least one file from an antimalware support server and updating at least one particular cache record for the at least one file based on the update. The particular cache record can be included in a local cache of a host device that includes a plurality of cache records, each cache record in the local cache corresponding to a respective file and including reputation data for the respective file. The local cache can be used by an antimalware tool local to the host device to assess files to be loaded on the host device, where cache records in the plurality of cache records other than the particular cache record are to be unaffected by the updating of the particular cache record.

Another general aspect of the subject matter described in this specification can be embodied in systems that include a processor device, memory element, and an antimalware client local to the host device. The antimalware client can be adapted, when executed by the processor device to receive an update for at least one file from an antimalware support server and update at least one particular cache record of a local cache for the at least one file based on the update for use by the antimalware client to assess files to be loaded on the host device.

These and other embodiments can each optionally include one or more of the following features. It can be determined whether the particular cache record exists, and updating the particular cache record can include adding the particular cache record to the local cache. The update can be for a plurality of files, a set of cache records corresponding to the plurality of files can be updated, and the set of cache records can include less than all of the plurality of cache records. The update can modify one or more values of the particular cache record and the update can modify less than the entirety of the particular cache record. Each cache record can include a hash of the respective file and the reputation data can identify attributes of the file relevant to reputation of the file. The reputation data can also or instead describe certificates for the file, reputation scores generated by the antimalware support server, reputation scores generated by a third party service and communicated to the host device by the antimalware support server, a prior decision by a local antimalware tool on the host device in response to a previous encounter with the file (e.g., based on other reputation data for the file), and behavior data describing behaviors detected for the file, among other examples. In the case of behavior data, a bit mask can be provided where each bit in the bit mask represents whether a corresponding behavior is associated with the file or not. Updating the particular cache record can include changing a value of a particular one of the bits of the mask value.

In general, one aspect of the subject matter described in this specification can be embodied in methods and executed instructions that include or cause the actions of identifying an update of at least a portion of reputation information maintained for a file, determining that the update is applicable to at least a particular one of a plurality of host devices in a domain, detecting an opportunity to communicate the update to the particular host device, and causing data corresponding to the update to be sent to the particular host device based at least in part on the opportunity.

Another general aspect of the subject matter described in this specification can be embodied in systems that include a processor device, memory element, and an antimalware support system. The antimalware support system can be adapted, when executed by the processor device, to identify an update of at least a portion of reputation information maintained for a file, determine that the update is applicable to at least a particular one of a plurality of host devices in a domain, detect an opportunity to communicate the update to the particular host device, and cause data corresponding to the update to be sent to the particular host device based at least in part on the opportunity.

These and other embodiments can each optionally include one or more of the following features. A queue of updates can be maintained for the particular host device and all updates included in the queue can be sent in connection with the opportunity. The update can be identified from data received from another one of the plurality of host devices, such as data describing attributes of the file detected at the other host device. The update can also be identified from data received from a threat intelligence service or data received from the other host device describing attributes of the file detected by entities providing information to the threat intelligence service. The update can apply to less than all of the plurality of host devices and can be determined to apply to the particular host device from a record identifying files described in local cache of the particular host device. The opportunity can include at least one of a query from the particular host device, expiration of a time period, and exceeding a threshold number of updates for the particular host device. For instance, the opportunity can be a query from the particular host device and the data can be sent to the particular host device together with a response to the query. The query can correspond to another file to which the update does not apply. The opportunity can include an expiration of a time period, and the data can be pushed to the particular host device in response to the expiration of the time period. The time period can include a duration of time since a last update for the particular host. The opportunity can also correspond to exceeding a threshold number of updates in a queue of updates maintained for the host device.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, cause the machine to:
   identify, using an antimalware client executed on a host device, a file in memory of the host device;
   determine, at the antimalware client, attributes of the file relating to reputation of the file;
   send a query from the host device to an antimalware support system relating to the file, wherein the query is to include local reputation data describing the attributes of the file and the query further comprises a request for the antimalware support system to perform a reputation analysis of the file in response to the query;
   receive, in response to the query, particular reputation data from the antimalware support system, wherein the particular reputation data is generated by the antimalware support system during the reputation analysis based at least in part on the local reputation data;
   receive a remediation script from the antimalware support system based on the query;
   run the remediation script on the antimalware client to remove the file from the memory of the host device; and
   use the antimalware client to dispose of the remediation script following the removal of the file.

2. The storage medium of claim 1, wherein the instructions when executed on a machine, further cause the machine to determine whether to allow the file to be loaded on the host device based, at least in part, on the local reputation data.

3. The storage medium of claim 1, wherein the particular reputation data describes behaviors of the file.

4. The storage medium of claim 1, wherein the host device is of a particular type and at least one rule for determining whether to allow the file to be loaded on the host device is for host devices of the particular type.

5. The storage medium of claim 1, wherein a copy of the file is to be sent with the query to the antimalware support system.

6. The storage medium of claim 1, wherein the instructions when executed on a machine, further cause the machine to generate a hash of the file, wherein the file is to be identified by the hash in the query.

7. The storage medium of claim 1, wherein the instructions when executed on a machine, further cause the machine to scan the file to identify one or more characteristics of the file to be included in the local reputation data.

8. The storage medium of claim 1, wherein the local reputation data includes a certificate of the file and wherein the instructions when executed on a machine, further cause the machine to determine whether to allow the file to be loaded on the host device based at least in part on the certificate.

9. The storage medium of claim 8, wherein the instructions when executed on a machine, further cause the machine to determine whether the certificate is included in a listing of approved certificates for a domain.

10. The storage medium of claim 8, wherein the instructions when executed on a machine, further cause the machine to determine whether the certificate is a certificate of one of a set of trusted publishers identified for a domain.

11. A method comprising:
    identifying, using an antimalware client executed on a host device, a file local to the host device;
    determining, using the antimalware client, attributes of the file;
    sending a query from the host device to an antimalware support system relating to the file,
    wherein the query is to include local reputation data describing the attributes of the file and the query further comprises a request for the antimalware support system to perform a reputation analysis of the file in response to the query;
    receiving particular reputation data from the antimalware support system, wherein the particular reputation data is generated by the antimalware support system during the reputation analysis based at least in part on the local reputation data;
    receiving a remediation script from the antimalware support system based on the query;
    running the remediation script on the antimalware client to remove the file from memory of the host device; and
    using the antimalware client to dispose of the remediation script following the removal of the file.

12. The method of claim 11, wherein the file comprises an executable file.

13. The method of claim 11, wherein the local reputation data is determined to be available for the file at the host device, and the method further comprises determining that the local reputation data is insufficient to determine whether to allow the file to be loaded on the host device.

14. The method of claim 11, wherein the particular reputation data includes a previously-determined reputation score for the file.

15. The method of claim 14, wherein the file is to be allowed to load on the host device when the reputation score is above a corresponding threshold score.

16. A system comprising:
    at least one processor device;
    at least one memory element; and an antimalware client local to a host device and adapted when executed by the at least one processor device to:

identify a file local to the host device;

scan the file to identify characteristics of the file;

generate local reputation data at the host device based on the characteristics of the file;

send a query to an antimalware support system relating to the file, wherein the query is to include the local reputation data and comprises a request for the antimalware support system to perform a reputation analysis of the file in response to the query;

receive, in response to the query, particular reputation data from the antimalware support system, wherein the particular reputation data is generated by the antimalware support system during the reputation analysis based at least in part on the local reputation data;

receive a remediation script from the antimalware support system based on the query;

run the remediation script on the antimalware client to remove the file from memory of the host device; and use the antimalware client to dispose of the remediation script following the removal of the file.

17. The system of claim 16, further comprising the antimalware support system to determine additional reputation data for the file based on the query.

\* \* \* \* \*